(12) United States Patent
Feldtkeller et al.

(10) Patent No.: US 7,683,595 B2
(45) Date of Patent: Mar. 23, 2010

(54) METHOD FOR ACTUATION, AND ACTUATING CIRCUIT FOR A SWITCH IN A POWER FACTOR CORRECTION CIRCUIT

(75) Inventors: Martin Feldtkeller, Munich (DE); Michael Herfurth, Gilching (DE)

(73) Assignee: Infineon Technologies Austria AG, Villach (AT)

( * ) Notice: Subject to any disclaimer, the term of this patent is extended or adjusted under 35 U.S.C. 154(b) by 18 days.

(21) Appl. No.: 11/893,371

(22) Filed: Aug. 15, 2007

(65) Prior Publication Data
US 2008/0252268 A1  Oct. 16, 2008

Related U.S. Application Data

(63) Continuation-in-part of application No. 11/786,049, filed on Apr. 10, 2007.

(51) Int. Cl.
*G05F 1/40* (2006.01)
*H02M 1/12* (2006.01)

(52) U.S. Cl. .................. 323/282; 323/284; 363/39

(58) Field of Classification Search ............ 363/39–48; 323/207, 282, 284, 290, 222, 351
See application file for complete search history.

(56) References Cited

U.S. PATENT DOCUMENTS

| | | | |
|---|---|---|---|
| 6,043,633 A | 3/2000 | Lev et al. | |
| 6,388,429 B1 | 5/2002 | Mao | |
| 6,577,079 B2 | 6/2003 | Zudrell-Koch et al. | |
| 6,744,241 B2 * | 6/2004 | Feldtkeller | 323/207 |
| 6,747,881 B2 * | 6/2004 | Schreiber | 363/37 |
| 6,806,694 B2 * | 10/2004 | Rupp et al. | 323/282 |
| 6,956,336 B2 | 10/2005 | Ribarich | |
| 7,031,173 B2 * | 4/2006 | Feldtkeller | 363/89 |
| 2008/0252269 A1 * | 10/2008 | Feldtkeller et al. | 323/210 |

FOREIGN PATENT DOCUMENTS

| | | |
|---|---|---|
| DE | 10032846 A1 | 1/2001 |
| EP | 1387476 A1 | 2/2004 |
| EP | 1189485 B1 | 12/2004 |

* cited by examiner

*Primary Examiner*—Jessica Han
(74) *Attorney, Agent, or Firm*—Maginot, Moore & Beck

(57) ABSTRACT

The document describes a method and an actuating circuit for actuating a switch regulating the power consumption in a power factor correction circuit which has input terminals for applying an input voltage and output terminals for providing an output voltage. In this case, the switch is cyclically turned on for an on-time and turned off for an off-time, respectively, with the on-time having a first on-time period and a second on-time period which is directly adjacent to the first on-time period. A length for the first on-time period is in this case dependent on the control signal, and a length for the second on-time period is proportional, at least for a prescribed range of values for an instantaneous value of the input voltage, to a quotient with a first first-degree function for this instantaneous value in the denominator and a second first-degree function for the instantaneous value in the numerator, with function values for the first function increasing as the instantaneous value rises.

31 Claims, 15 Drawing Sheets

METHOD FOR ACTUATION, AND ACTUATING CIRCUIT FOR A SWITCH IN A POWER FACTOR CORRECTION CIRCUIT

This application claims priority under 35 U.S.C. §120 from U.S. patent application Ser. No. 11/786,049, filed Apr. 10, 2007, which is incorporated herein by reference.

BACKGROUND

The present invention relates to a method for actuation and to an actuating circuit for a switch in a power factor correction circuit (power factor controller, PFC).

A power factor correction circuit usually is a step-up converter (boost converter) and comprises an inductive storage element, a rectifier arrangement, connected to the inductive storage element, for providing an output voltage, and a switch connected to the inductive storage element. The switch regulates the current drawn by the inductive storage element on the basis of the output voltage and is connected such that the storage element absorbs energy via input terminals, and is magnetized as a result, when the switch is closed, and outputs the absorbed energy to the rectifier arrangement, and is demagnetized as a result, when the switch is subsequently opened.

To control the power consumption, and hence the output voltage, such a power factor controller generates a control signal which is dependent on the output voltage and which determines particularly the lengths of the magnetization phases of the inductive storage element.

The input voltage for a power factor controller is usually a rectified mains voltage and therefore has a voltage profile in the form of the magnitude of a sine wave. In the case of a power factor controller, the current drawn will ideally be controlled such that a mean value for an input current is proportional to the applied input voltage. In an ideal power factor correction circuit, in which the energy absorbed by the inductive storage element when the switch is closed is output fully to the rectifier arrangement when the switch is opened, this can be achieved by setting the on-time to a value which is dependent on the output voltage and—when the switch has been turned-off—by turning the switch on again when the inductive storage element is free of energy or demagnetized. The power consumption is then proportional to the square of the input voltage and has a sinusoidal profile at a frequency which corresponds to twice the mains frequency.

In a real power factor correction circuit, however, losses occur which for example, are caused by a parasitic capacitance present in parallel to the switch. Such losses become even more noticeable the smaller the instantaneous value of the power consumptions, and result in distortion of the current profile of the input current over the sinusoidal profile of the mains voltage. This means that a total harmonic distortion in the input current is significantly greater than zero.

To compensate for such losses which distort the current profile, it is known to extend the on-time in comparison with the on-time which is set by the control signal.

SUMMARY

One example of the invention relates to a method for actuating a switch regulating the power consumption in a power factor correction circuit which has input terminals for applying an input voltage and output terminals for providing an output voltage, in which the switch is cyclically turned on for an on-time and turned off for an off-time, respectively, in which a control signal which is dependent on the output voltage is generated, and in which the on-time has a first on-time period and a second on-time period which is directly adjacent to the first on-time period. In this connection, a length of the first on-time period is dependent on the control signal, and a length of the second on-time period is proportional, at least for a given range of values for an instantaneous value of the input voltage, to a quotient having a first first-degree function for this instantaneous value in the denominator and a second first-degree function for the instantaneous value in the numerator, where function values for the first function increase as the instantaneous value rises.

In one example of the invention, an actuating circuit for a switch regulating the power consumption in a power factor correction circuit which has input terminals for applying an input voltage and output terminals for providing an output voltage comprises a control signal input for supplying a control signal, an input voltage signal input for supplying a signal which is dependent on the input voltage and an output for providing an actuating signal for the switch. In addition, the actuating circuit comprises means for cyclically producing a turn-on level for a signal actuating the switch for an on-time which has a first on-time period and a second on-time period which is directly adjacent to the first on-time period, where a length for the first on-time period is dependent on the control signal and where a length for the second on-time period is proportional, at least for a prescribed range of values for an instantaneous value of the input voltage, to a quotient with a first first-degree function for this instantaneous value in the denominator and a second first-degree function for the instantaneous value in the numerator, with function values for the first function increasing as the instantaneous value rises.

BRIEF DESCRIPTION OF THE DRAWINGS

Examples of the present invention are explained in more detail below with reference to figures.

FIG. 20 shows a further example of the second signal generation circuit.

In the figures, unless stated otherwise, identical reference symbols denote the same circuit components and signals with the same meaning.

DETAILED DESCRIPTION OF THE DRAWINGS

Figure 1:
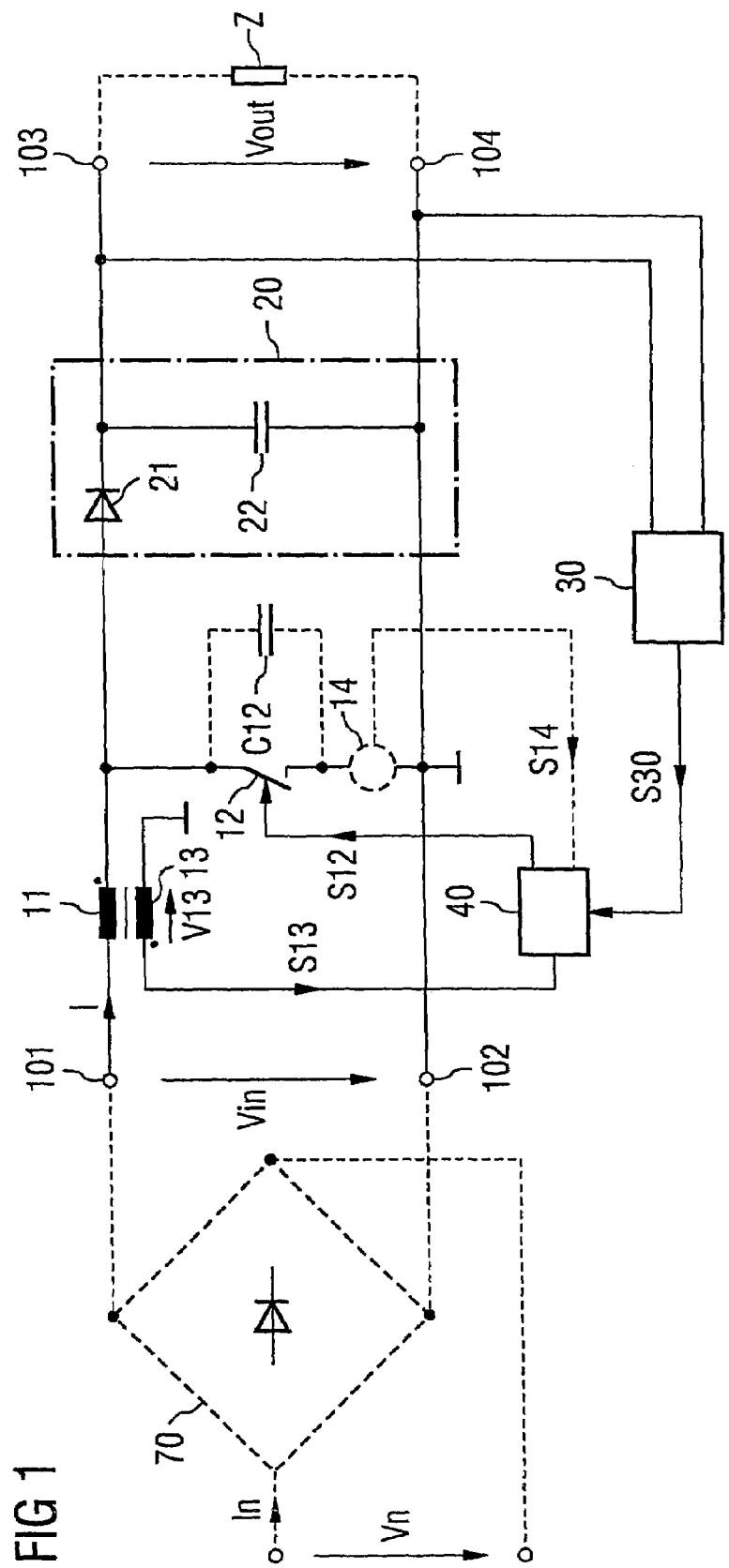
FIG. 1 shows an example of a power factor correction circuit with a switch, an actuating circuit for actuating the switch and a control arrangement for providing a control signal supplied to the actuating circuit.

FIG. 1 shows an example of a power factor correction circuit (power factor controller, PFC). The power factor controller of FIG. 1 is a step-up converter and has input terminals 101, 102 for applying an input voltage Vin, an inductive storage element 11 and a rectifier arrangement 20 connected to the inductive storage element 11. The inductive storage element 11 and the rectifier arrangement 20 are connected in series with one another between the input terminals 101, 102. In the example shown, the rectifier arrangement 20 has a series circuit containing a rectifier element 21, for example a diode, and a capacitive storage element 22, for example a capacitor. An output voltage Vout from the switched-mode converter for supplying a load Z (shown in dashes) can be tapped off from output terminals 103, 104 of the rectifier arrangement 20. This output voltage Vout corresponds to a voltage across the capacitive storage element 22 of the rectifier arrangement 20 in the example shown.

To control a current drawn by the inductive storage element 10, and hence to control the power consumption, and hence to control the output voltage Vout from the switch-mode converter, a switching arrangement having a switch 12 and an actuating circuit 40 for the switch 12 is provided. This switching arrangement is used to cyclically magnetize the inductive storage element 11, which is in the form of a storage inductor, for example, during a magnetization time and then demagnetize it for a demagnetization time, respectively. To this end, the switch 12 is connected in series with the inductive storage element 11 between the input terminals 101, 102 and in parallel with the rectifier arrangement 20. When the switch 12 is on or closed, approximately the complete input voltage Vin is present across the inductive storage element 11, and in this case the inductive storage element absorbs energy via the input terminals 101, 102 and is magnetized as a result. When the switch 12 is subsequently off or open, the inductive storage element 11 outputs the previously absorbed energy to the rectifier arrangement 20 and is demagnetized as a result.

The actuating circuit 40 generates an actuating signal S12 for the switch 12 which governs whether the switch 12 is on or off. In particular, this switch 12 may be in the form of an MOS transistor, for example in the form of a MOSFET or IGBT. In this case, a load path or drain/source path in such a MOS transistor is connected in series with the inductive storage element 11, and a control terminal or gate terminal of such a MOS transistor is supplied with the actuating signal S12 for turning on and off. Optionally, a driver circuit (not shown) may be connected to the control terminal of the switching element 31. Such driver circuit serves to convert signal levels of the actuating signal S40 to signal levels which are suitable for actuating the switching element.

To control the output voltage Vout, the actuating circuit 40 is supplied with a control signal S30 which is generated by a control arrangement 30 to which the output voltage Vout is supplied as an input signal. This control signal S30 contains information about a power consumption which currently needs to be set using the duty ratio of the switch, with the aim of keeping the output voltage Vout constant. The control signal is generated, by way of example, from information about an instantaneous discrepancy between the output voltage Vout and a nominal value and/or from a discrepancy between the output voltage Vout and a nominal value within a time window in the past.

Figure 2:
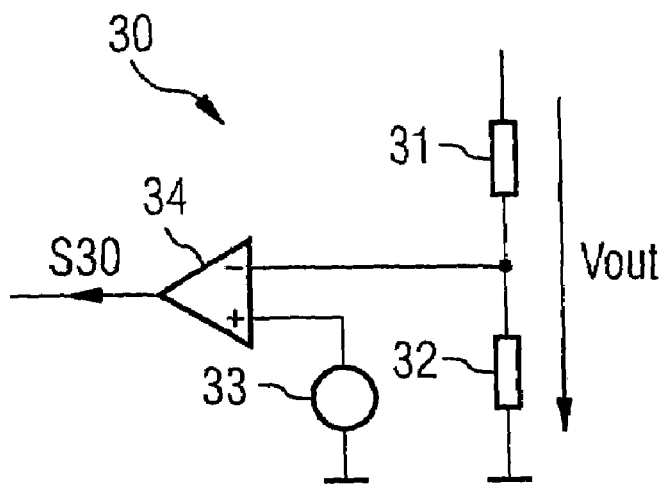
FIG. 2 shows an example of an implementation of the control arrangement.

To generate the control signal S30, the control arrangement 30 comprises, with reference to FIG. 2, a voltage divider 31, 32 for dividing down the output voltage Vout, a reference voltage source 33 for providing a reference voltage V33 and a control amplifier 34, to which the divided-down output voltage and the reference voltage V33 are supplied, for example. In this context, the reference voltage V33 represents a nominal value for the output voltage Vout. This reference voltage and the divided-down output voltage Vout are supplied to a control amplifier 34 whose output provides the control signal S30. Depending on the desired control response for controlling the output voltage, this control amplifier may have a proportional response, an integral response or a proportional-integral response.

The actuating circuit 40 is designed to actuate the switch 12 such that the power factor controller is operated in uninterrupted delta current mode, also called critical conduction mode (CritCM). In this mode of operation, the switch 12 is respectively turned on when the storage inductor 11 has been completely demagnetized, that is to say when an input current I for the power factor controller has fallen to zero. With this mode of operation, the actuating circuit 40 requires information about the magnetization state of the storage inductor 11. With reference to FIG. 1, this magnetization information can be provided by an auxiliary coil 13, for example, which is inductively coupled to the storage inductor 11. A voltage V13 which is present across this auxiliary coil 13 and which, in the example shown, is supplied to the actuating circuit 40 as a magnetization signal S13 contains information about the magnetization state of the storage inductor 11, as is yet to be explained.

During operation of the power factor controller, the output voltage Vout firstly needs to be set to a nominal value approximately independently of load. Secondly, a mean value for the input current I needs to be proportional to the applied input voltage Vin. By way of example, this input voltage Vin is generated from a sinusoidal mains voltage Vn by means of a bridge rectifier 70. The proportionality between the input current I and the input voltage Vin or between the mains voltage Vn and the current In drawn from the mains minimizes the reactive-power absorption from the mains. In the case of an ideal power factor controller, the energy absorbed by the storage inductor 11 during the time for which the switch 12 is turned on is output completely to the rectifier arrangement 20 and accordingly to the load Z when the switch 12 is subsequently opened. In the case of a real power factor controller, however, parasitic components, particularly a parasitic capacitance C12 in the switch 12, need to be taken into account. When an MOS transistor is used as switch 12, this parasitic capacitance is made up of the drain-source capacitance and of the drain-gate capacitance. This parasitic capacitance C12 has its charge reversed upon every switching operation in the switch 12, which requires a portion of the respective energy stored in the storage inductor 11. The resultant losses have a greater effect on the profile of the input current I the less magnetic energy absorbed and hence the smaller an instantaneous value for the input voltage Vin or the mains voltage Vn. Other parasitic capacitances are a junction capacitance of the rectifier element 21 and a winding capacitance of the storage inductors.

Figure 3:
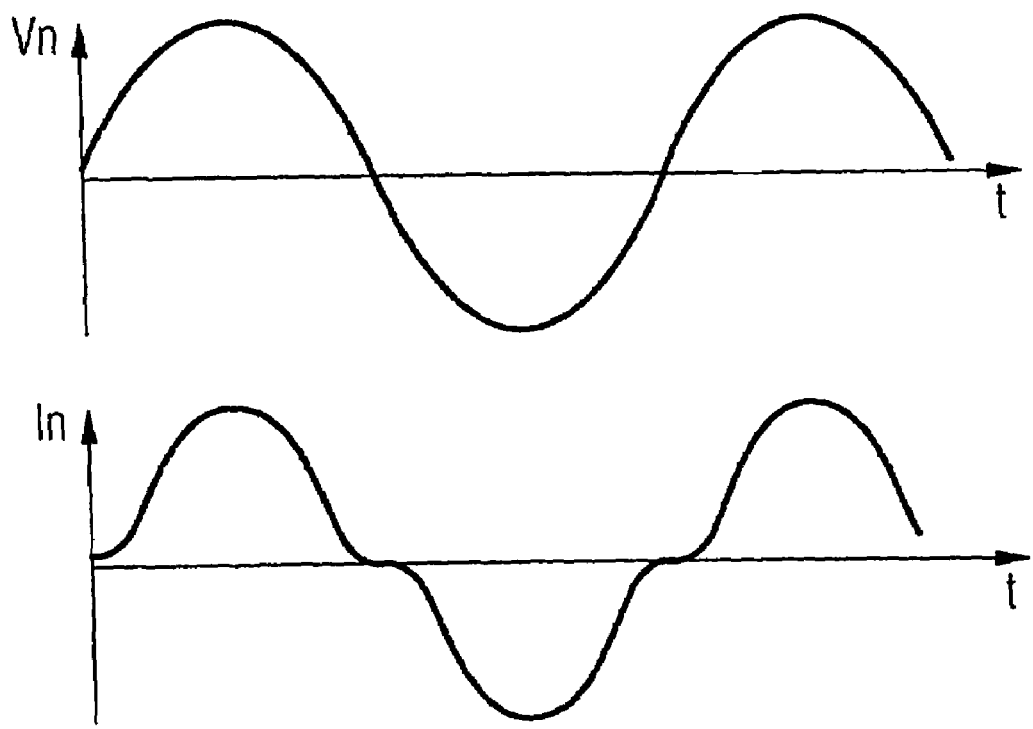
FIG. 3 illustrates time profiles for a mains voltage and an input current for a power factor correction circuit in which no circuit means are provided for reducing the total harmonic distortion in the input current.

FIG. 3 shows the time profile for the sinusoidal mains voltage Vn and the time profile for the current In drawn from the mains for a conventional power factor controller in which no measures have been taken to compensate for the switching losses explained above. In this case, the mains current In is distorted in comparison with a sinusoidal profile, particularly in the range of small amplitudes of the mains voltage Vn. A total harmonic distortion for this mains current In, which indicates the relationship between the energy content of the harmonics and the total energy, is significantly greater than zero in this case.

To compensate for the switching losses, and hence to reduce the total harmonic distortion, one embodiment of the inventive method provides for the on-time to be set such that it has two on-time periods, a first on-time period which is dependent on the control signal S30, and a second on-time period which is dependent on the input voltage Vin and which, for a prescribed amplitude range of the input voltage Vin, is dependent on the reciprocal of the input voltage Vin. This is explained below with reference to FIGS. 4 and 5.

Figure 4:
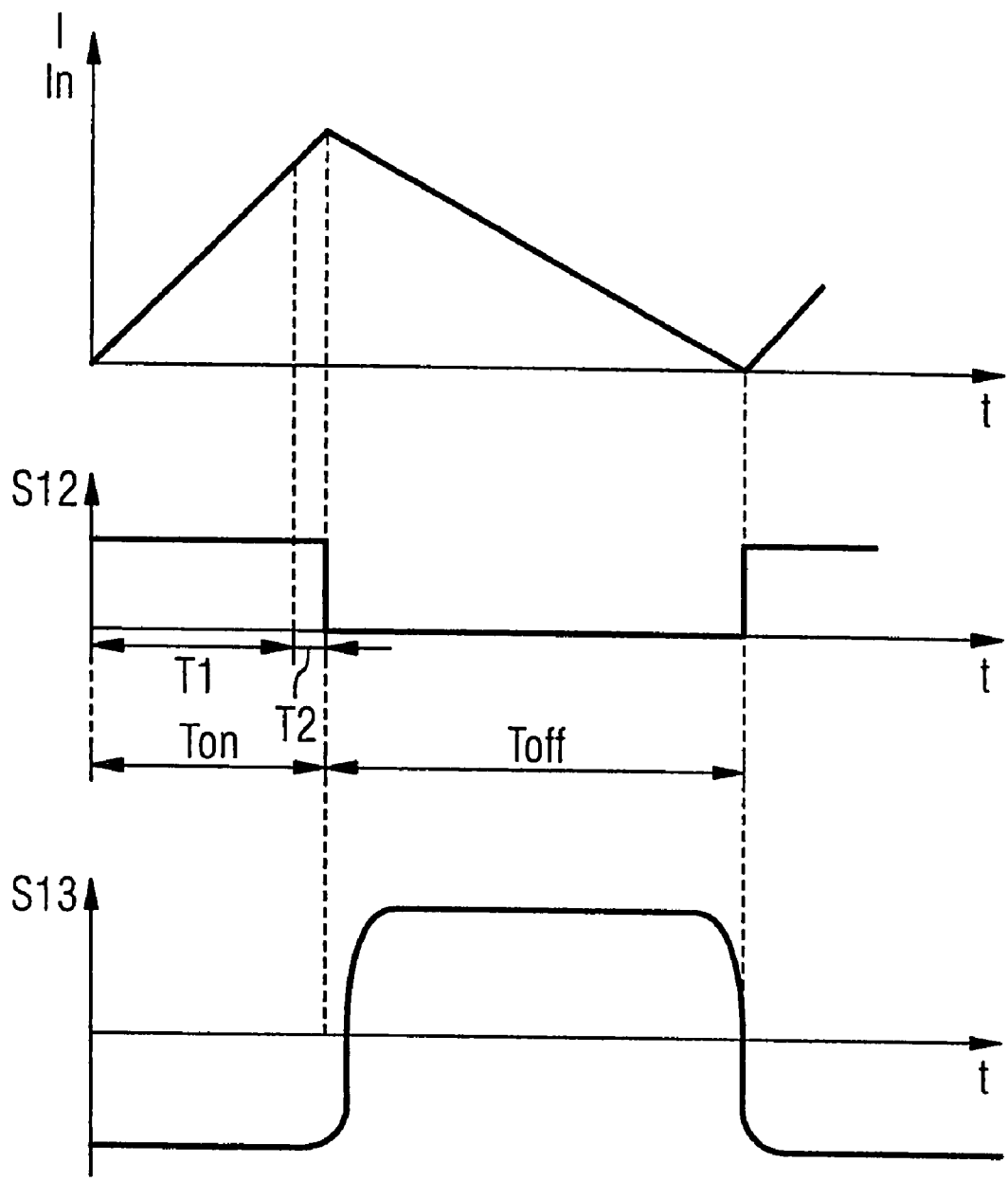
FIG. 4 illustrates the time profile of an actuating signal generated by an actuating circuit in accordance with an example of the invention and resultant time profiles for the input current and for a magnetization signal.

FIG. 4 shows time profiles for the input current I or the mains current In, for the actuating signal S12 and for the magnetization signal S13 for an actuation period of the switch 12. This actuation period comprises an on-time Ton, during which the actuating signal S12 is at a turn-on level, so that the switch 12 is on. The input current I rises linearly during this on-time, with the following being true for a time-related change dI/dt in the input current I:

$$\frac{dI}{dt} = \frac{Vin}{L} \quad (1)$$

where L denotes the inductance of the storage inductor 11. During the off-time Toff that follows the on-time Ton, the actuating signal S12 assumes a turn-off level, so that the switch 12 is off. During this offtime Toff, the storage inductor 11 is demagnetized, and the input current I accordingly falls linearly. In this context, the gradient is proportional to the difference between the input voltage Vin and the output voltage Vout. The offtime Toff ends, and the switch 12 is turned on again, when the storage inductor 11 has been completely demagnetized or when the input current I has fallen to zero. To detect this demagnetized state of the storage inductor 11, zero crossings in the magnetization signal S13 can be evaluated. In the case of the interconnection of the auxiliary coil 13 shown in FIG. 1, the voltage V13 across the auxiliary coil 13 is negative during the on-time Ton, changes its polarity during the off-time and falls to zero when the storage inductor 11 has been completely demagnetized. In this case, the storage inductor 11 is in a demagnetized state when the first zero crossing of the magnetization signal S13 occurs upon a falling edge of this magnetization signal S13.

The on-time Ton is made up of two on-time periods, a first on-time period T1 which is dependent on the control signal S30, which is dependent on the output voltage, and a second on-time period T2 which is dependent on the input voltage Vin. The sum of the first and second on-time periods T1, T2, which are subsequently also referred to as first and second on-times, gives the on-time Ton in this case. It is generally true that:

$$T1 = f1(S30) \quad (2a)$$

$$T2 = f2(Vin) \quad (2b)$$

where f1 and f2 denote functions which are yet to be explained.

The first on-time T1 is used for controlling the power consumption of the power factor controller with the aim of setting the output voltage Vout to the desired nominal value. In this context, it generally applies that the first on-time T1 is greater the greater the power consumption of the load Z connected to the output terminal 103, 104. When a control arrangement 30 is used, which generates a control signal S30 which increases as the power consumption of the load Z rises, the length of the first on-time period T1 can be set in proportion to the control signal S30. When the power consumption of the load Z is constant and the RMS value of the mains voltage Vn is constant, the length of this first on-time period T1 remains constant over a plurality of actuation periods, in each case independently of the instantaneous value of the input voltage Vin or mains voltage Vn.

The energy absorbed during the second on-time period T2 is used to compensate for the previously explained lower power consumption caused by parasitic effects. In this case, the length of this second on-time period changes with the instantaneous value of the input voltage Vin, this instantaneous value respectively being able to be assumed to be constant for the length of an actuation period. The length of the second on-time period T2 increases as the instantaneous value of the input voltage Vin falls. In one embodiment of the invention, provision is made in this context for the second on-time T2 to be proportional to the reciprocal of the input voltage Vin, that is to say:

$$T2 \sim \frac{1}{Vin}. \quad (3)$$

Figure 5A:
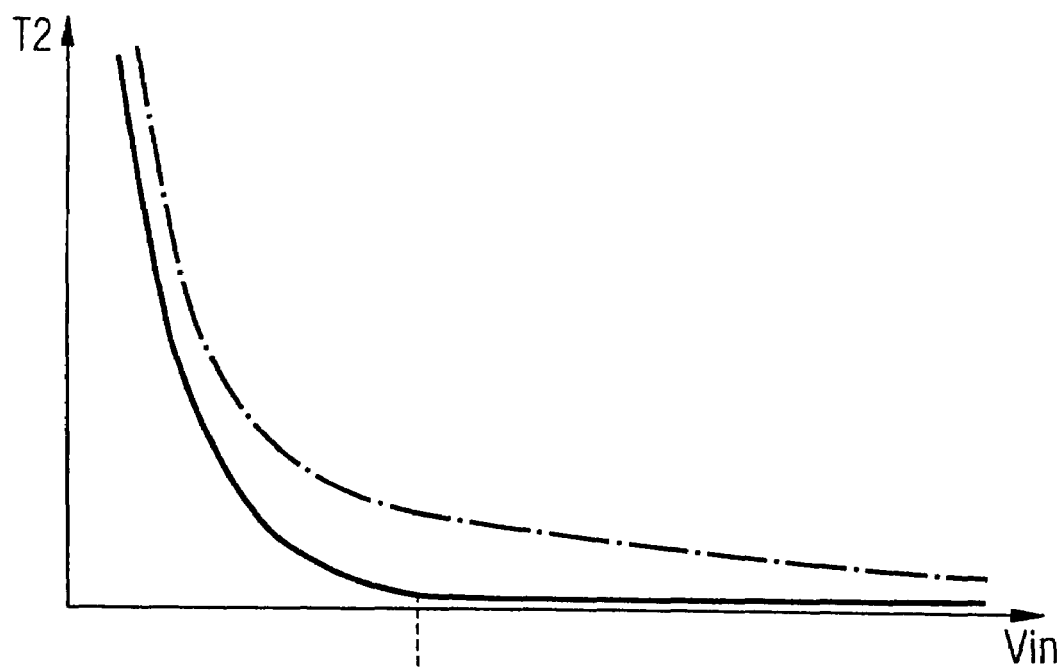
(FIG. 5A and profiles of a denominator function and a numerator function, from which the on-time period is dependent, dependent on an input voltage (FIG. 5B)).

A second on-time period T2 ascertained in this manner which is dependent on the instantaneous value of the input voltage Vin is shown in a dot-dashed line in FIG. 5a.

To prevent the length of the second on-time period T2 from approaching infinity when the input voltage assumes an instantaneous value of zero, another embodiment has provision for the second on-time T2 to be set such that it is proportional to the reciprocal of an input voltage Vin increased by an offset d. That is to say:

$$T2 \sim \frac{1}{Vin + d} \quad (4)$$

where d denotes an offset which, for Vin=0, prescribes the length of the second on-time period T2 and hence the maximum possible length of this second on-time period T2.

In one variant of the inventive method, provision is made for the dependency of the second on-time T2 on the input voltage Vin, explained with reference to equations (3) and (4), to be set only for a range of values of the input voltage Vin which comprises instantaneous values which are smaller than a prescribed threshold value $Vin_0$, and for the second on-time to be set to a constant $T2_0$ value, which may in particular be zero, independently of the respective instantaneous value for instantaneous values larger than this threshold value. Hence:

$$T2 \sim \frac{1}{Vin + d} \text{ for } 0 \le In \le Vin_0 \quad (5a)$$

$$T2 = T2_0 \text{ for } Vin > Vin_0 \quad (5b)$$

where Vs denotes the threshold value, $T2_0$ denotes the on-time for instantaneous values of the input voltage Vin which are larger than the threshold value $Vin_0$.

Figure 5B:
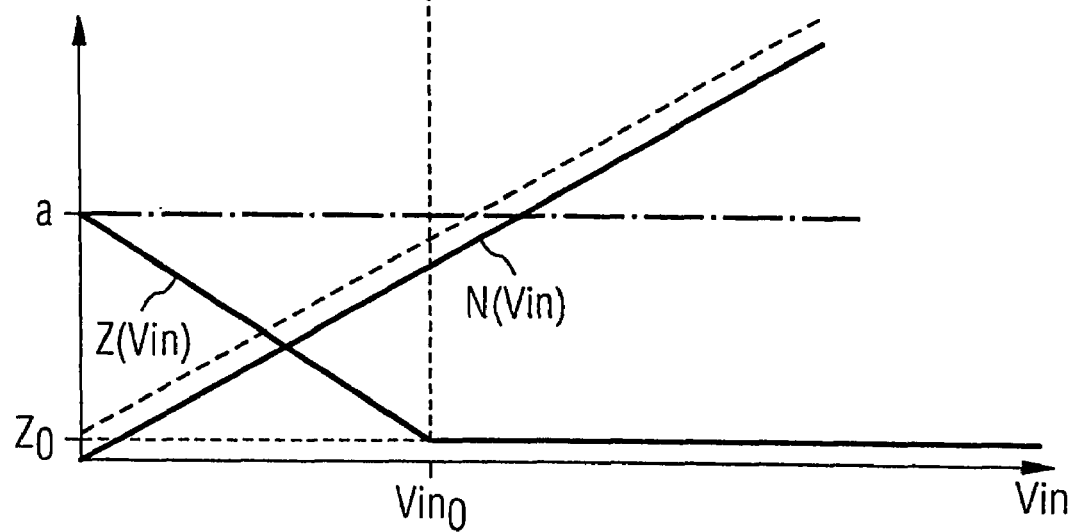
FIG. 5 illustrates generating an on-time period for the actuating signal on the basis of an input voltage for the power factor correction circuit.

In another embodiment of the inventive method, provision is made for the length of the second on-time T2 to be set such that it is proportional to the quotient of two functions Z(Vin), N(Vin) which are respectively first-degree functions for the on-time Vin, where the numerator function Z (Vin) decreases linearly as the input voltage Vin rises, and the denominator function N (Vin) increasingly linearly as the input voltage Vin rises. Examples of two such functions are shown in FIG. 5B. A second on-time T2 which has been set using these functions is shown as a solid line in FIG. 5A. For the numerator function and the denominator function, it is generally true here that:

$$Z(Vin) = a - b \cdot Vin \quad (6a)$$

$$N(Vin) = c \cdot Vin + d \quad (6b)$$

In this case, the solid line for the function N (Vin) in FIG. 5B illustrates the special case for d=0. The dotted line illustrates the special case for d≠0, in which an excessively (infinitely) long second on-time T2 is prevented from arising for Vin=0. For d≠0, the maximum second on-time $T2_{max}$ is obtained as:

$$T2_{max} = T2(vin = 0) = \frac{Z(vin = 0)}{N(Vin = 0)} = \frac{a}{d} \quad (7)$$

The coefficients a and d therefore determine the maximum second on-time T2. The coefficients b and c determine the reduction in the second on-time T2 when the instantaneous value of the input voltage Vin rises.

The second on-time T2 is dependent on the quotient of the previously explained first-degree functions at least for a prescribed range of values for the instantaneous values of the input voltage.

FIG. 5B shows the special case in which the second on-time T2 is proportional, for a range of values [0, $Vin_0$] for the instantaneous value of the input voltage Vin, to the quotient of the numerator and denominator functions Z (Vin), N (Vin) based on equations (6a) and (6b). For instantaneous values larger than the threshold value $Vin_0$, the numerator function in the illustrated example is constant, which means that the second on-time T2 is proportional to the reciprocal of the denominator function, i.e. is proportional to the reciprocal of a linearly rising first-degree function for the input voltage Vin. That is to say:

$$T2 \sim \frac{Z(Vin)}{N(Vin)} \text{ for } 0 \le Vin \le Vin_0 \quad (8a)$$

$$T2 \sim \frac{Z_0}{N(Vin)} \text{ for } Vin > Vin_0. \quad (8b)$$

By way of example, the limit value $Vin_0$ is dependent on the output voltage. For this limit value $Vin_0$, it holds that $0.3 \cdot Vout < Vin_0 < 0.7 \cdot Vout$ and particularly $Vin_0$ [illegible] $0.5 \cdot Vout$, for example. In the example shown, the numerator function Z is constant, which means that $Z_0 = a - b \cdot Vin_0$ is true.

For instantaneous values of the input voltage, for which $c \cdot Vin \gg d$ is true, the dependency of the second on-time T2 on the input voltage Vin can be represented as follows:

$$T2 = \frac{a - b \cdot Vin}{c \cdot Vin} = \frac{a}{c \cdot Vin} - \frac{b}{c} \quad (9)$$

The second on-time T2 is therefore made up of a component which is proportional to the input voltage Vin and a constant (negative) offset component.

The relationships explained with reference to equations (3) and (4) between the second on-time period T2 and the input voltage Vin are special instances of the dependency of the second on-time T2 on the quotient of two first-degree functions for b=0 and d=0 or b=0 which was explained with reference to equations (6a) and (6b). It generally applies that the second on-time T2 is proportional to a quotient with a first first-degree function N (Vin) for the instantaneous value of the input voltage Vin in the denominator and a second at most first-degree function Z (Vin) for the instantaneous value of the input voltage Vin in the numerator.

For the special instances of equations (3) and (4), the numerator function Z (Vin) is a zero-order function, i.e. a constant value.

Examples of an actuating circuit 40 which receives the actuating signal S12 with a first on-time T1, which is dependent on the control signal S30, and with an on-time T2, which is proportional to a quotient of an at most first-degree function in the numerator and a first-degree function in the denominator, are explained below.

Figure 6:
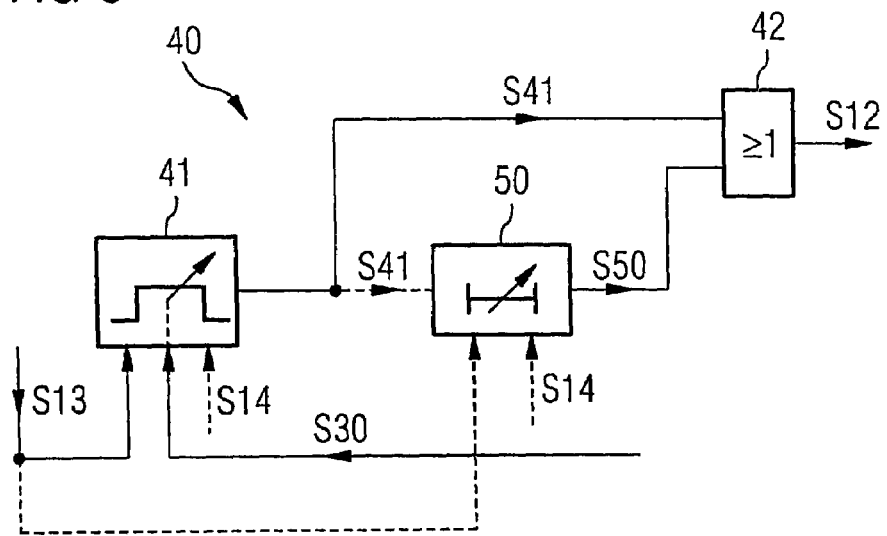
FIG. 6 shows an example of the actuating circuit with a first signal generation circuit for producing a first on-time period and a second signal generation circuit for producing a second on-time period for the actuating signal.

FIG. 6 shows an example of the actuating circuit 40 which, for the purpose of generating the actuating signal S12, has a first and a second signal generation circuit 41, 50 and a logic gate 42, in the example shown an OR gate. In the case of this actuating circuit 40, the first signal generation circuit 41 generates a first pulse-width-modulated signal S41 which prescribes the start of the on-time Ton and the length of the first on-time period T1. A second pulse-width-modulated signal S50 generated by the second signal generation circuit 50 prescribes the length of the second on-time period T2. The two pulse-width-modulated signals S41, S50 are supplied to the OR gate 42, whose output provides the actuating signal S12. In particular, the second pulse-width-modulated signal S50 can be generated such that the second signal S50 already assumes a turn-on level even before the first pulse-widthmodulated signal S41 assumes a turn-off level. The effect achieved by this is that the switch T1 remains safely turned on during the entire on-time Ton. However, the second pulse-width-modulated signal S50 changes from a turn-on level to a turn-off level only after a time delay by the second on-time T2 after the first pulse-width-modulated signal S41 has changed from a turn-on level to a turn-off level. In this actuating circuit, the two signal generation circuits 41, 50 perform the function of delay elements with an adjustable delay time.

The first signal generation circuit 41 is supplied with the control signal S30 and with the magnetization signal S13 in order to generate the first pulse-width-modulated signal S41. Optionally, this first signal generation circuit 41 may be supplied with a current measurement signal S14 which, with reference to FIG. 1, is provided by a current measuring arrangement 14 connected in series with the switch 12. This current measurement signal S14 is proportional to a current flowing through the switch 12 during the on-time.

Figure 7:
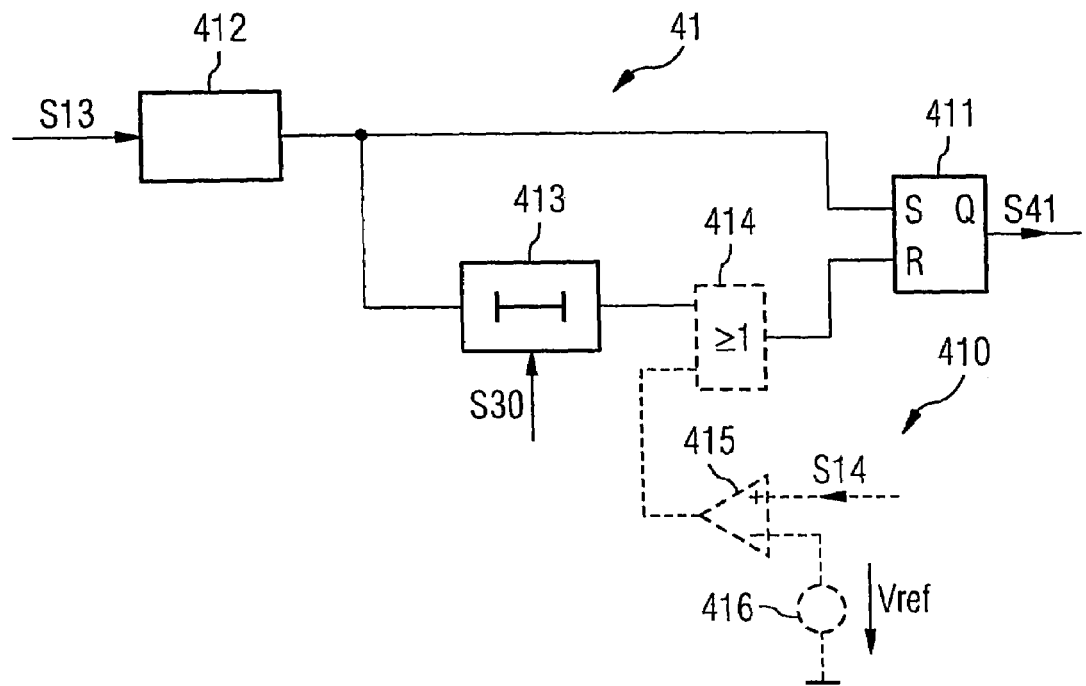
FIG. 7 shows an example of the first signal generation circuit.

An example of implementation of a first signal generation circuit is shown in FIG. 7. This signal generation circuit 41 has a flipflop 411, which is in the form of an RS-type flipflop in the example and whose output provides the first pulse-width-modulated signal S41. For the explanation which follows, it is assumed that this flipflop 411 produces a turn-on level for the first pulse-width-modulated signal S41 when set and produces a turn-off level for this signal S41 when reset. A setting signal for setting this flipflop 411 is generated by a zero crossing detector 412 which is supplied with the magnetization signal S13. This zero crossing detector 412 is designed to detect a zero crossing in the magnetization signal S13 for a prescribed edge of the magnetization signal and, upon detecting such a zero crossing, to set the flipflop 411 in order to generate a turn-on level for the first pulse-width-modulated signal S41 and hence a turn-on level for the actuating signal S12. The detected edge of the magnetization signal S13 is the falling edge, for example, with reference to FIG. 3.

In addition, the actuating circuit 41 has a controllable delay element 13 which is supplied with the control signal S13 for the purpose of setting the delay time. This delay element 413 determines the duration of a turn-on level for the first pulse-width-modulated signal S41 and hence the length of the first on-time period T1. The delay element 413 resets the flipflop 411 when the delay time which has been set by the control signal S30 has elapsed. To this end, the delay element 413 routes the setting signal for the flipflop 411, which is present at the output of the zero crossing detector 412, to the Reset input R of this flipflop 411 after a time delay.

Optionally, the signal generation circuit 41 has an overcurrent detector 410 (shown in dashes) which is used to reset the flipflop 411 early if the input current I exceeds a prescribed threshold value. To this end, the overcurrent detector 410 has a comparator 415 which compares the current measurement signal S14 with a reference value Vref provided by a reference voltage source 416. If the current measurement signal S14 exceeds the reference value Vref then the flipflop 411 is reset via an OR gate 414, which is supplied with the output signal from the delay element 413 and with the output signal from the comparator 415, early, i.e. even before the delay time of the delay element 413 has elapsed. This prevents damage to the power factor controller as a result of excessive input currents. By way of example, the cause of an excessive input current may be a large instantaneous value for the input voltage Vin with a long first on-time T1 set by means of the control signal S30. In the case of large input voltages Vin, as already explained, the second on-time T2 is very short or even zero, so that early termination of the first on-time is tantamount to early termination of the second on-time.

Without being shown in more detail, the overcurrent detector 410 can reset or turn off not only the first signal generation circuit 41 but also the second signal generation circuit 50. This ensures that when an overcurrent is detected the on-time, and hence the turning-on of the switch 12, is safely terminated.

To ascertain the second on-time period T2, the second signal generation circuit 50 requires information about the instantaneous value of the input voltage Vin, as already explained. This instantaneous value of the input voltage Vin can be derived from the magnetization signal S13 or from the current measurement signal S14. The second signal generation circuit 50 is therefore supplied with the magnetization signal S13 or alternatively with the current measurement signal S14, for example.

Figure 8:
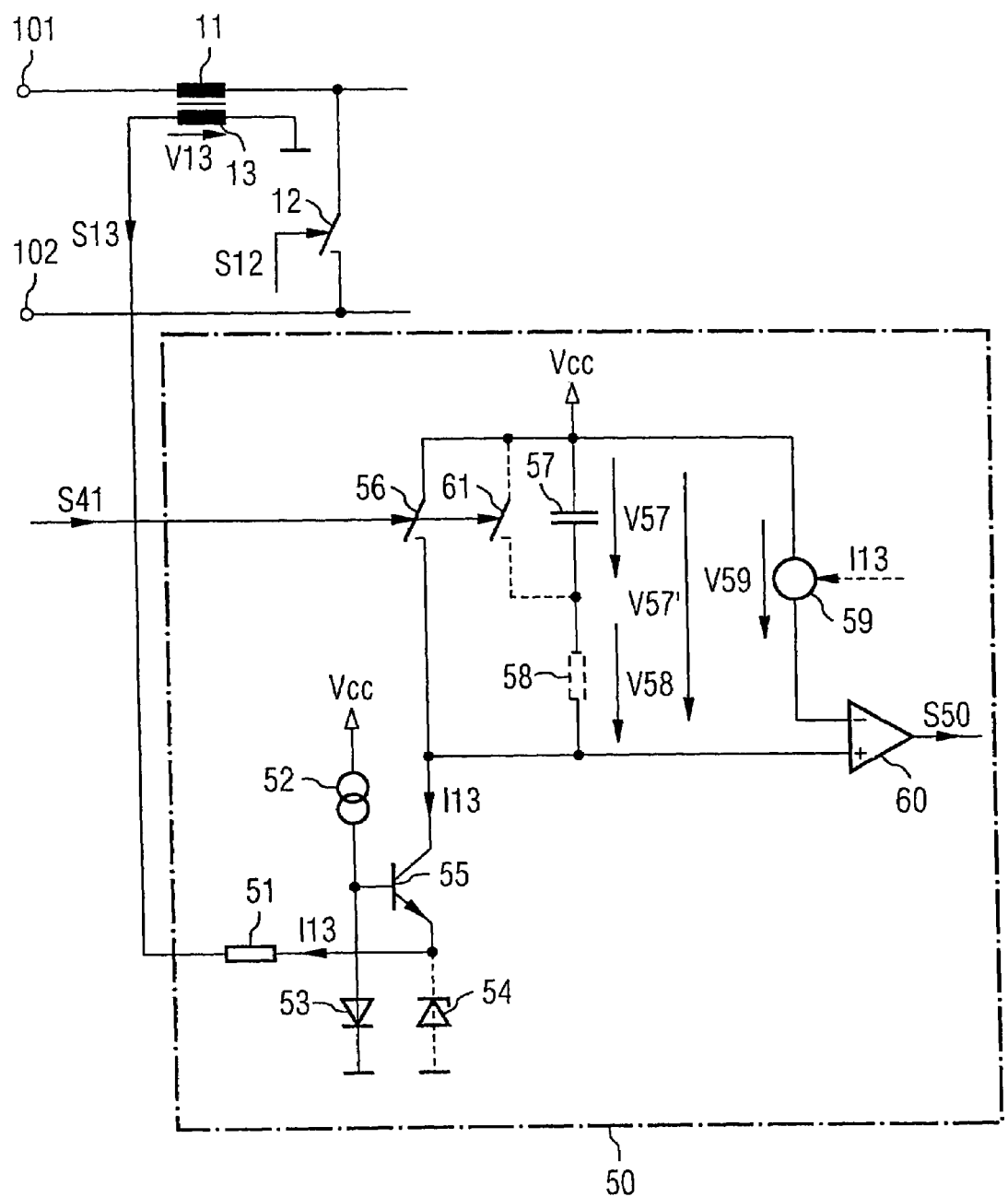
FIG. 8 shows a first example of the second signal generation circuit.

FIG. 8 shows an example of a second signal generation circuit 50 which ascertains information about the instantaneous value of the input voltage Vin from the magnetization signal S13 in order to generate the second pulse-width-modulated signal S50. In this context, use is made of the fact that during the time for which the switch 12 is turned on the voltage V13 across the storage inductor 11 corresponds to the input voltage Vin—if one neglects a voltage drop across the switch 12. This input voltage Vin corresponds to the absolute value of the mains voltage Vn, if one neglects a voltage drop across the bridge rectifier 70. In this context, the voltage V13 across the auxiliary winding 13 is proportional to the voltage across the storage inductor 11 and thus proportional to the input voltage Vin.

It should be pointed out that the previously described order in which the first and second on-times T1, T2 are ascertained is merely to be understood as an example and hence not imperative.

However, the order described, where first the on-time T1 and then the on-time T2 are produced, has the advantage that at the end of the first on-time T1 the voltage V13 which is required for producing the second on-time T2 has already settled, which means that errors can be avoided when ascertaining the second on-time T2.

The second signal generation circuit 50 shown has a capacitive storage arrangement with a capacitive storage element 57, for example a capacitor, which is charged with a current I13 which is proportional to the voltage V13 across the auxiliary winding 13 under the control of the first pulse-width-modulated signal S41. A voltage V57 which is present across the capacitor 57 and which rises during the charging operation is compared with a reference voltage V59. In this case, a period of time between the start of charging of the capacitor 57 and the time at which the capacitor voltage V57 reaches the reference voltage V59 determines the second on-time T2. To compare the capacitor voltage V57 and the reference voltage V59, a comparator 60 is provided whose one input has the capacitor 57 connected to it and whose other input has a reference voltage source 59, providing the reference voltage 59, connected to it. The output of this comparator 60 provides the second pulse-width-modulated signal S50.

To control the charging operation for the capacitor 57, a switch 56 is provided which is actuated by the first pulse-width-modulated signal S41 and which is connected in parallel with the capacitor 57. Connected in series with the parallel circuit containing the capacitor 57 and the switch 56 is a current source arrangement 51-55 which is controlled by the auxiliary voltage V13 and which generates the current I13 which is proportional to the auxiliary voltage V13. In this case, the switch 56 is actuated such that it is closed, and therefore shorts the capacitor 57, when the first pulse-width-modulated signal S41 is at a turn-on level. If the first pulse-width-modulated signal S41 assumes a turn-off level at the end of the first on-time T1, the switch 56 is opened in order to charge the capacitor 57 with the current I13 proportional to the input voltage Vin as a result. In the example shown, the parallel circuit containing the switch 56 and the capacitor 57 is connected between a terminal for (positive) supply potential Vcc and the current source arrangement 51-55. In this circuit arrangement, the capacitor V57 is charged to a negative voltage, taking the supply potential Vcc as a reference, by the current I13 when the switch 56 is open. Accordingly, the reference voltage V59 is a negative voltage, taking the supply potential Vcc as a reference. A noninverting input (positive input) of the comparator 60 is connected to the capacitor 57 and an inverting input (negative input) is connected to the reference voltage source V59 in this arrangement.

Figure 9:
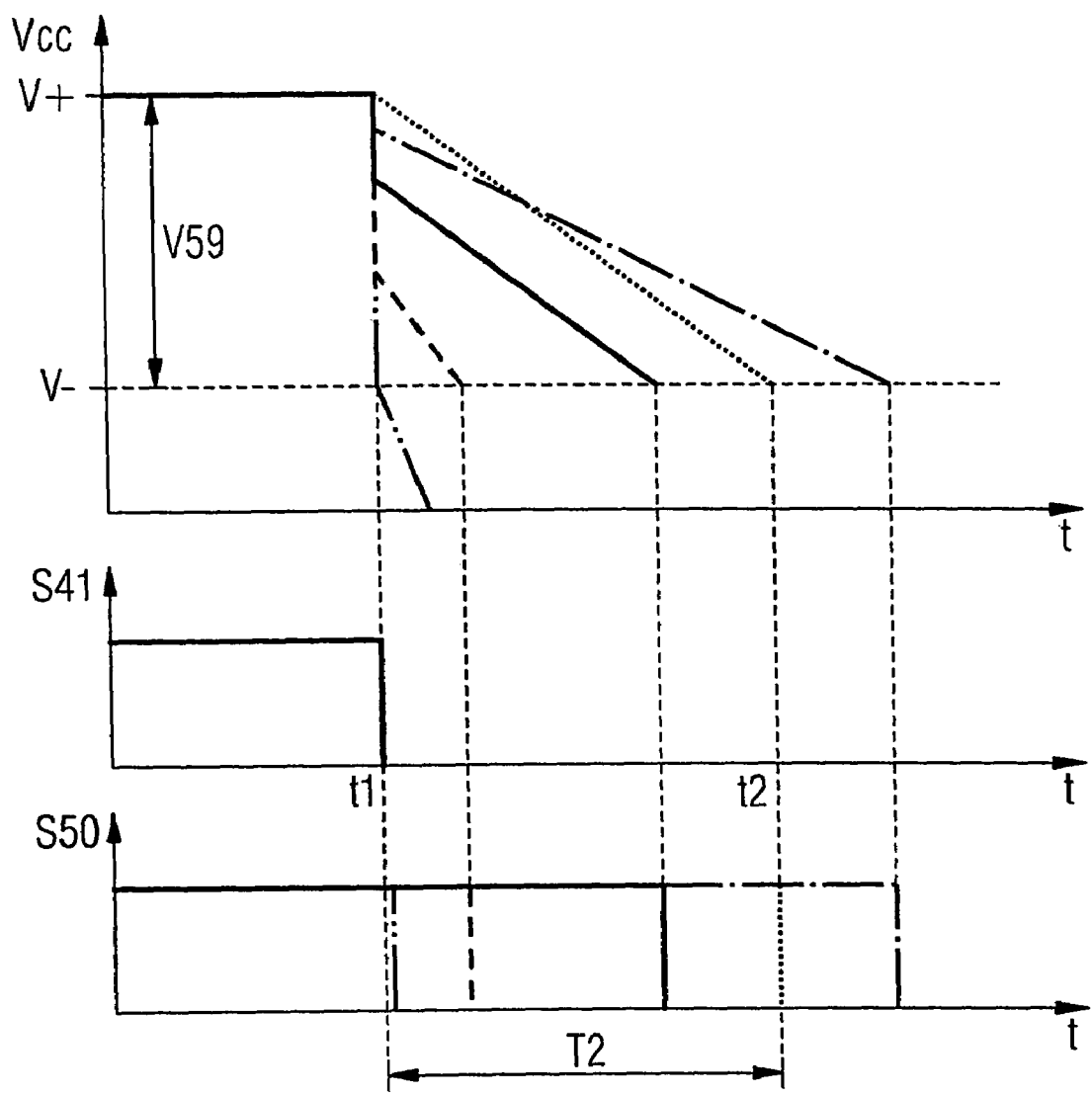
FIG. 9 illustrates the functionality of the second signal generation circuit shown in FIG. 8 using signal time profiles.

The way in which the circuit explained in FIG. 8 works is explained below with reference to time profiles for a potential V+ on the positive input of the comparator 60, for the first pulse-width-modulated signal S41 and for the second pulse-width-modulated signal S50, which is shown in FIG. 9. For the illustration, it is assumed that the first pulse-width-modulated signal S41 is initially at a turn-on level. This means that the switch 56 is closed, as a result of which the positive input of the comparator 60 is at the supply potential Vcc, which is higher than the potential on the negative input of the comparator 60. The second pulse-width-modulated signal S50 therefore likewise assumes a turn-on level, in the present case a High level, actually during the period of time for which the first pulse-width-modulated signal S41 is at a turn-on level. By the end of the turn-on level of the first signal S41 at a time t1, the capacitor is charged by means of the current I13. The electrical potential V+ on the positive input of the comparator 60 therefore falls linearly over time from the supply potential Vcc, which is shown in FIG. 9 as a dotted line. In FIG. 9, t2 denotes a time at which the capacitor voltage V57 has risen to the reference voltage V59, as a result of which the potential V+ on the positive input falls below the potential V− on the negative input of the comparator 60 and the second pulse-width-modulated signal S50 assumes a turn-off level. In this case, the period of time between the times t1 and t2 corresponds to the second on-time T2, which in the example shown is inversely proportional to the input voltage Vin, as explained briefly below.

Within the period of time t2, the capacitor voltage V57 is charged by the current I13 from zero to the value of the reference voltage V59. That is to say that for the voltage V57 at time t2:

$$V57 = \frac{I13 \cdot T2}{C} = V59, \quad (10)$$

where C denotes the capacitance value of the capacitor 57. It follows directly from this that for the second on-time T2:

$$T2 = \frac{V59 \cdot C}{I13}. \quad (11)$$

The reference voltage V59 and the capacitance value C of the capacitor are constant. As already explained above, the current I13 is directly proportional to the input voltage Vin, so that the second on-time T2 is inversely proportional to the input voltage Vin.

Optionally, it is possible to connect a nonreactive resistor 58 in series with the capacitor 57 in the capacitive storage arrangement and to compare a voltage which is present across the series circuit comprising the capacitor 57 and the resistor 58, and which is subsequently referred to as V57', with the reference voltage V59. In this circuit arrangement, the voltage V57' is made up of the voltage across the nonreactive resistor 58, which, considered over the second on-time T2, is constant in time, and a voltage V57 across the capacitor 57 which rises over time. Time profiles for the electrical potential on the positive input of the comparator 60 for such a series circuit comprising a capacitor and a nonreactive resistor 58 are shown as dot-dash, solid, dashed or double-dot-dash lines in FIG. 9 for currents I13 of different magnitude. In this case, the electrical potential V+ falls abruptly to start with at time t1 and then falls linearly further over time. The abrupt decrease in the electrical potential is caused by the voltage drop across the nonreactive resistor 58, which is proportional to the current I13 and which is therefore all the larger the larger this current I13 is. In a signal generation circuit 50 with a series circuit comprising a capacitor 57 and a nonreactive resistor 58, the second on-time T2 is inversely proportional to the input voltage Vin and proportional to a first-degree function for the input voltage Vin, as explained below.

At time t2, at which the end of the second on-time T2 has been reached, the following is true for this arrangement: V57'=V57+V58=V59. When V58=R·I13, where R is the resistance value of the nonreactive resistor 58, and when V57=I13·T2/C, the following is true:

$$T2 = \frac{C \cdot (V59 - R \cdot I13)}{I13}. \quad (12)$$

Since the current I13 is proportional to the input voltage Vin, as already explained, the second on-time T2 in this arrangement is inversely proportional to the input voltage Vin and proportional to a first-degree function for the input voltage Vin.

In this circuit arrangement, the reference voltage V59 and the nonreactive resistor 58 may be tuned to one another such that equation (12) applies only for a prescribed range of values of the input voltage Vin and that the second on-time T2 is zero or is approximately zero for instantaneous values of the input voltage Vin which are greater than a prescribed threshold value. In this context, the nonreactive resistor 58 is in tune with the reference voltage V59 such that the voltage drop V58 is greater than the reference voltage V59 for input voltage values Vin which are greater than the threshold value $Vin_0$. In this case:

$$R \cdot I13_0 = V59 \quad (13)$$

where $I13_0$ denotes the value of the current I13 which is obtained for the instantaneous value of the input voltage Vin which corresponds to the limit $Vin_0$.

Such a case, in which the capacitor voltage V57 already exceeds the reference voltage at the start of the charging operation, is shown in FIG. 9 by the double-dot-dash line. Regardless of the charging of the capacitor 57, the voltage V57' already exceeds the reference voltage V59 at time t1, which means that the second pulse-width-modulated signal S50 is already set to a turn-off level at time t1, or taking into account signal propagation times shortly after time t1.

As an alternative or in addition to providing a nonreactive resistor 58 in series with the capacitor 57, it is possible to provide the reference voltage source 59 as a controlled voltage source which generates a reference voltage V59 which is dependent on the current I13 and hence on the input voltage Vin. In this case, this reference voltage V59 has a linearly falling dependency on the input voltage Vin, and hence falls when the instantaneous value of the input voltage Vin rises.

Alternatively, when a series circuit is provided which has a capacitor 57 and a nonreactive resistor 58, it is possible to connect the switch 56 merely in parallel with the capacitor 57. The potential on the positive input of the comparator 60 is therefore always below the supply potential Vcc at least by the voltage drop across the nonreactive resistor 58. The result of this is that for input voltages Vin which are larger than the prescribed threshold value $Vin_o$ the second pulse-width-modulated signal S50 does not assume a turn-on level at any time during the actuation period, which means that the control signal S12 is determined exclusively by the pulse-width-modulated signal S41 generated by the first signal generation circuit 41. The second turn-on time is accordingly safely zero.

Optionally, it is possible to connect the switch 56 in parallel with the series circuit and an additional switch 61 merely in parallel with the capacitor 57. The advantage is that firstly the capacitor 57 is safely discharged even for short on-times and short-subsequent first on-times T1, and secondly that the second on-time T2 is at least the comparator propagation time in the comparator 60 and hence has a constant profile at the crossing point $Vin_0$. In the case of the afore-mentioned example, in which a switch is connected only in parallel with the capacitor 57, an abrupt change in the function of the level of the duration of the comparator propagation occurs at the crossing for the threshold value Vin0 (see FIG. 5), because the comparator assumes a High level at the output for instantaneous values Vin<Vin0 at the start of the second on-time T2 and only needs to change if the potential V+ on the noninverting input drops below the potential V− on the inverting input immediately afterwards, while for instantaneous values Vin>Vin0 it assumes a Low level at its output from the very beginning.

The manner of operation of the voltage-controlled current source arrangement 51-55 shown in FIG. 8, which generates the current I13 which is proportional to the auxiliary voltage V13 or to the input voltage Vin, is explained below. This current source arrangement comprises a nonreactive resistor 51, which is connected in series with the auxiliary winding 13, and a control circuit 52-55, which sets an electrical potential on a connection of the resistor 51 which is remote from the auxiliary winding 13 to the value of a reference-ground potential, to which the connection of the auxiliary winding 13 which is remote from the resistor 51 is connected. A voltage drop across the resistor 51 therefore corresponds to the auxiliary voltage V13. In this case, the resistor 51 has the current I13 flowing through it, which, by virtue of the resistance value of the resistor 51 is proportional to the auxiliary voltage V13.

The control arrangement comprises a series circuit with a current source 52 and a diode 53, which is connected between a terminal for a supply potential Vcc and the reference-ground potential, and also a bipolar transistor 55 with a base connection, a collector connection and an emitter connection. The base connection is connected to a node which is common to the current source 52 and to the diode 53, and the collector-emitter path is connected in series with the parallel circuit containing the switch 56 and the capacitor 57 between this parallel circuit and the resistor 51 connected in series with the auxiliary winding 13.

During the time for which the switch 12 controlling the power consumption of the power factor controller is turned on, the voltage V13 across the auxiliary winding 13 is negative, and the current I13 therefore flows from the resistor 51 in the direction of the auxiliary winding 13. This current I13 is delivered by the terminal for supply potential Vcc via the bipolar transistor 55 and the parallel circuit containing the switch 56 and the capacitor 57. In the case of this circuit arrangement, an actuating voltage for the bipolar transistor 55 corresponds to a voltage drop V53 across the forward biased diode 53. Since the base-emitter voltage required for turning on the bipolar transistor 55 corresponds at least approximately to this forward voltage of the diode 53, the emitter connection of the bipolar transistor 55 and hence the connection of the nonreactive resistor 51 which is remote from the auxiliary winding 13 are at reference-ground potential.

Optionally, a voltage limiting element, for example in the form of a zener diode 54, may be connected between the node which is common to the bipolar transistor 55 and to the nonreactive resistor 51 and reference-ground potential. This voltage limiting element is used to limit the voltage across the auxiliary coil 13 when the auxiliary coil 13 is at a positive voltage.

Figure 10:
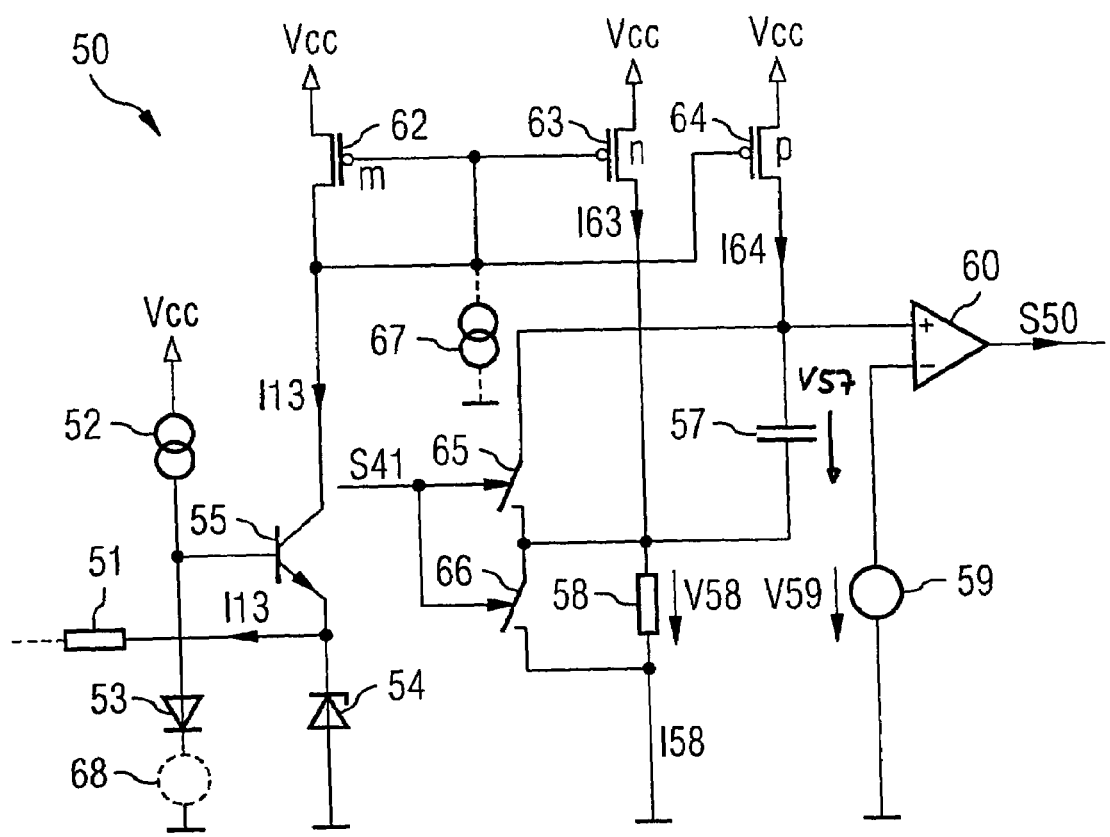
FIG. 10 shows a second example of the second signal generation circuit.

In the case of the signal generation circuit 50 shown in FIG. 8, the capacitor voltage V57 and the voltage V58 across the resistor 58 can be tuned to one another for a given current I13 using the capacitance value C and the resistance value R. FIG. 10 shows an example of a signal generation circuit 50 in which these voltages V57, V58 can be set relative to one another regardless of the nonreactive resistance value and the capacitance value 57. In this signal generation circuit 50, the current source arrangement comprises a current mirror with an input transistor 62 through which the current I13 flows, and a first and a second output transistor 64, 63. In this case, the first output transistor 64 has a first current I64 available on it which is related to the current I13 by means of a first current mirror ratio (m:p). This first current I64 flows through the series circuit containing the capacitor 57 and the resistor 58. The second output transistor 63 has a second current I63 available on it which is related to the current I13 by means of a second current mirror ratio (m:n). This second current I63 is fed into a node which is common to the capacitor 57 and to the resistor 58 and flows only through the resistor 58. The nonreactive resistor 58 therefore has a current I58 flowing through it which is made up of the first current I64 and the second current I63. The capacitor 57 has only the second current I64 flowing through it. In the signal generation circuit 50 shown, a first switch 65 is connected in parallel with the capacitor 57 and a second switch 66 is connected in parallel with the nonreactive resistor 58, these respectively being actuated by the first pulse-width-modulated signal S41. In this arrangement, the second switch 66 is present as an option. If this switch is dispensed with, the voltage V57' corresponds to the sum of the capacitor voltage V57 and the resistor voltage V58 always corresponds at least to the voltage V58 which is present across the resistor 58.

One advantage of this example is that comparatively small capacitance and resistance values may be used, which fits in with monolithically integrated implementation when the current flowing through the capacitance is set using the current mirror such that it is significantly smaller than the current I13, that is to say when it holds that p<<n. Furthermore, the current I63 additionally flowing through the resistor 58 and the capacitor current I64 can be set independently of one another.

In the case of the circuit arrangement shown in FIG. 10, the voltages V57' and a reference voltage V59 provided by the reference voltage source 59 take reference-ground potential as a reference.

To implement an offset value or zero-order coefficients d of the denominator function not equal to zero, the current source arrangement 51-55 may have a constant current source 67 connected in parallel with it, for example. Alternatively or in addition, it is possible for the current I13 to be produced not proportional to the auxiliary voltage V13 but rather proportional to an auxiliary voltage reduced by an offset. This can be achieved, with reference to FIG. 10, by connecting the cathode of the diode 53 in the control arrangement to reference-ground potential not directly but rather connecting it to reference-ground potential via a positive reference voltage source 68.

Figure 11:
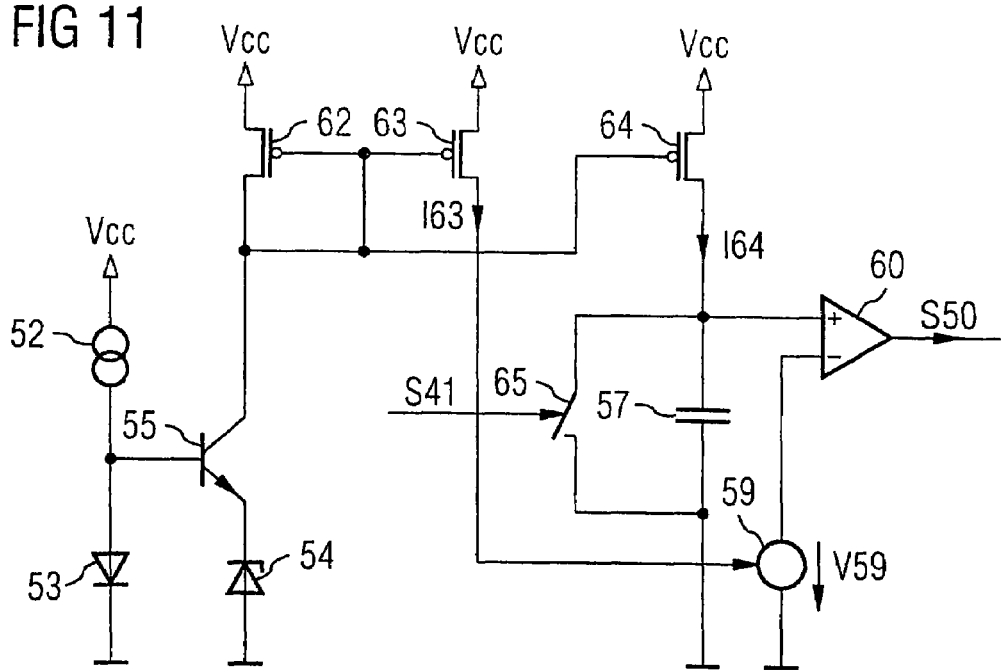
FIG. 11 shows a third example of the second signal generation circuit.

FIG. 11 shows a modification of the second signal generation circuit shown in FIG. 10. In the case of this signal generation circuit 50 shown in FIG. 11, a nonreactive resistor connected in series with the capacitor 57 has been replaced by a controlled reference voltage source 59 which generates a reference voltage V59 which is dependent on the current I13. This reference voltage source 59 is a current-controlled voltage source, which in the example is supplied with the current I63 from the first output transistor 63 in the current mirror.

Figure 12:
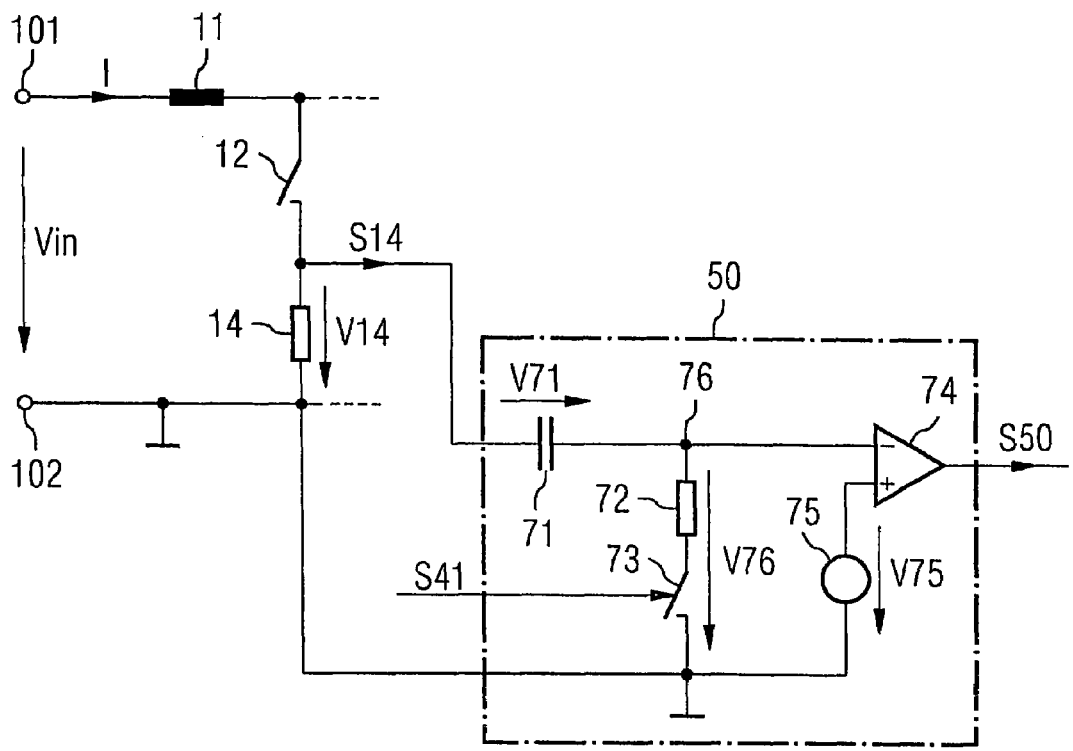
FIG. 12 shows a fourth example of the second signal generation circuit.

FIG. 12 shows an example of a second signal generation circuit 50 in which a piece of information about the instantaneous value of the input voltage Vin is derived from the current measurement signal S14 when the switch 12 is closed. In this case, use is made of the fact that the current I, and hence the measurement voltage V14, rise proportionally to the instantaneous value of the input voltage Vin over time. In this example, the current measuring arrangement 14 connected in series with this switch 12 is in the form of a nonreactive resistor having a resistance value R14. In this case, the current measurement signal S14 corresponds to a voltage V14 across the measuring resistor 14. In this signal generation circuit 50, the second pulse-width-modulated signal S50 is available at the output of a comparator 74, one of whose inputs, in the example of the inverting input, is capacitively coupled to the node which is common to the switch 12 and to the current measuring resistor 14. For the purpose of capacitive coupling, a capacitive storage element 71, for example a capacitor, is provided. Another input of the comparator 74, in the example the noninverting input, has a reference voltage V75 provided by a reference voltage source 75 applied to it. This reference voltage source 75 is connected between the comparator input and reference-ground potential in the example.

In addition, the signal generation circuit 50 has a switch 73 which is actuated by the first pulse-width-modulated signal S41 and which is connected between a node which is common to the coupling capacitance 71 and to the comparator input and reference-ground potential. This switch is closed when the first pulse-width-modulated signal S41 is at a turn-on level, as a result of which the inverting comparator input is at reference-ground potential. During this period of time, the second pulse-width-modulated signal S50 assumes a turn-on level. During this period of time, a voltage V71 across the coupling capacitor 71 follows the voltage V14 across the current measuring resistor 14, which rises proportionally to the input voltage Vin over time.

The switch 73 is opened under the control of the first pulse-width-modulated signal 41 when this signal assumes a turn-off level. If the switch 73 is open when the power factor controller's switch 12 controlling the power consumption is still closed then the measurement voltage V14 continues to rise proportionally to the input voltage Vin. From the time at which the switch 73 is opened, the electrical potential V76 on the inverting comparator input rises from zero at the same gradient as that at which the measurement voltage V14 rises, i.e. proportionally to the input voltage Vin. The profile for the rise in this voltage V76 over time is shown in dots in FIG. 13. In this case, t1 denotes the time at which the first pulse-width-modulated signal S41 assumes a turn-off level and at which the switch 73 is opened.

The rising electrical potential V76 reaches the value of the reference voltage V75 at a time t2. At this time, the second pulse-width-modulated signal S50 assumes a turn-off level. In the case of this signal generation circuit, the second turn-on time T2 is determined by the period of time within which the potential V76 on the inverting input of the comparator 74 rises from reference-ground potential to the value of the reference voltage V75. In this context, the speed at which this voltage V76 rises is proportional to the input voltage Vin in accordance with the speed at which the measurement voltage V14 rises. Hence, it holds that:

$$\frac{d(V76)\cdot}{dt\cdot} = \frac{Vin\cdot}{L\cdot}R14, \tag{14}$$

where L denotes the inductance of the storage inductor 11. For the period of time T2, it holds that:

$$T2 = \frac{V75 \cdot L}{Vin \cdot R14}. \tag{15}$$

The second on-time T2 brought about by this signal generation circuit 50 is therefore inversely proportional to the input voltage Vin and proportional to the reference voltage V75 and the inductance L of the storage inductor, the latter variables being constant.

Figure 13:
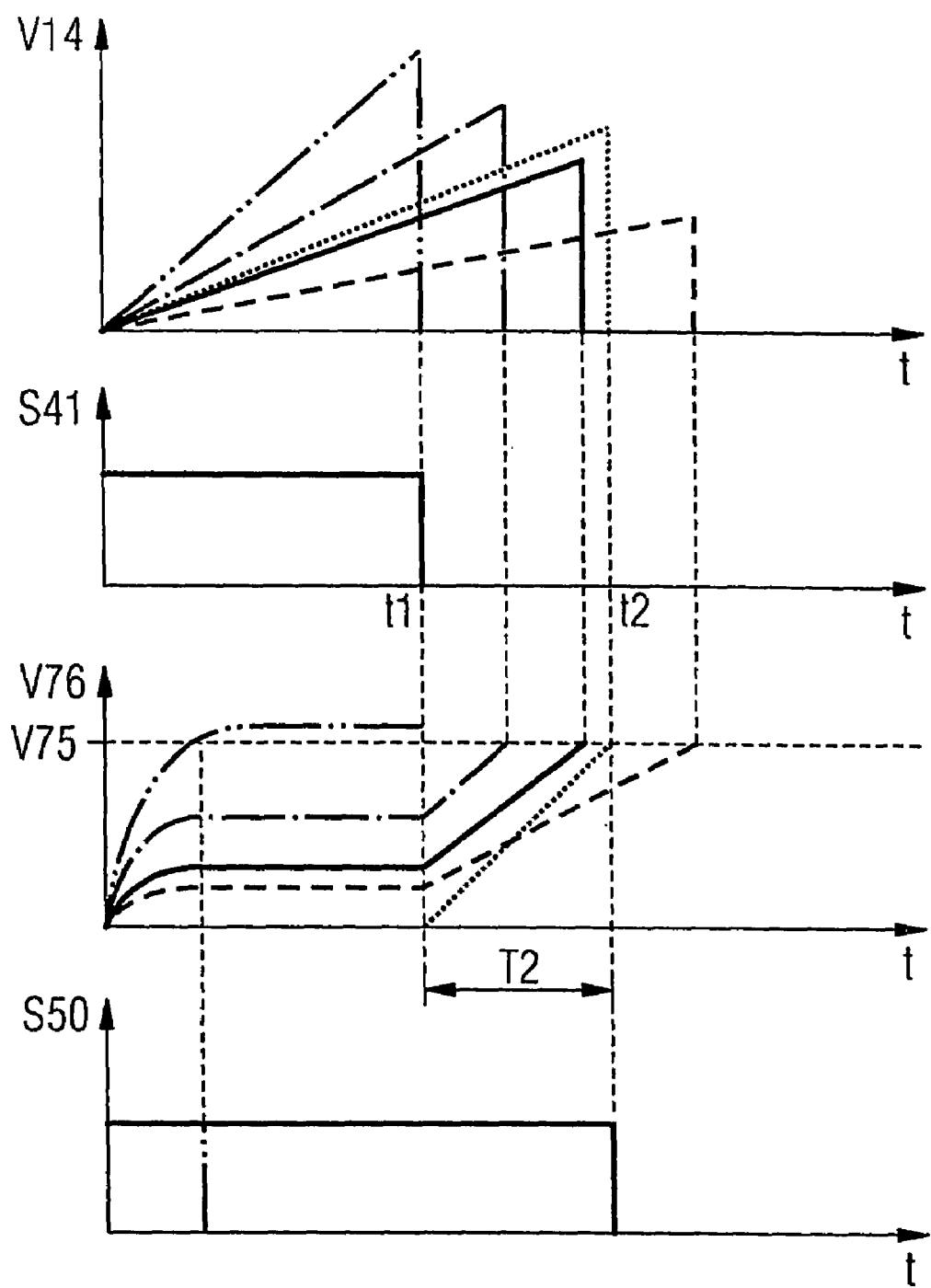
FIG. 13 illustrates the functionality of the second signal generation circuit shown in FIG. 12 works using signal time profiles.

Optionally, it is possible to connect a nonreactive resistor 72 in series with the switch 73. With reference to FIG. 13, the electrical potential V76 on the inverting input of the comparator 74 rises while the first pulse-width-modulated signal S41 is actually at a turn-on level, on account of the current flowing when the switch 73 is on. When the switch 73 is turned on, this voltage rise takes place exponentially on the basis of an RC time constant for the RC element formed by the coupling capacitance 71 and the nonreactive resistor 72. On the basis that this RC time constant is very small in comparison with the period of time during which the switch 73 remains turned on under the control of the first pulse-width-modulated signal S41, at time t1 this voltage V76 reaches a voltage value which is proportional to the input voltage Vin and for which the following is true:

$$V76(t1)=Vin \cdot R \cdot C \cdot R14/L \tag{16},$$

where R denotes the resistance value of the nonreactive resistor 72 and C denotes the capacitance value of the coupling capacitance 71. When the switch 73 opens, this voltage V76 continues to rise linearly at a gradient which is proportional to the input voltage Vin. FIG. 13 shows the time profile for this electrical potential V76 at the inverting input of the comparator 74 for various time profiles of the measurement voltage V14 and hence for various instantaneous values of the input voltage Vin. The dashed curve, the solid curve, the dot-dash line and the double-dot-dash line show the profile of the electrical potential V76 for an increasing input voltage Vin in this case.

In this context, it holds for the second on-time T2 that:

$$T2 = \frac{L \cdot V75/R14 - Vin \cdot R \cdot C}{Vin}. \quad (17)$$

The on-time T2 is therefore inversely proportional to the input voltage Vin and proportional to a first-degree function for the input voltage Vin which decreases linearly with the input voltage.

In this case, the RC time constant and the reference voltage V75 can be used to set, in particular, a threshold value for the input voltage Vin, from which point onwards the second on-time T2 is equal to zero or at least approximately equal to zero. For input voltages above this threshold value, the voltage which is present across the nonreactive resistor 72 during the time for which the switch 73 is turned on is already higher than the reference voltage V75, which means that the second pulse-width-modulated signal S50 falls to a turn-off level actually during this period of time. The time profile of the electrical potential on the inverting input of the comparator 74 and the resultant time profile of the second pulse-width-modulated signal S50 are shown as a double-dot-dash line in FIG. 13.

It should be pointed out that the time profiles of the measurement voltage V14 and of the electrical potential V76 on the inverting input of the comparator 74 in FIG. 13 are shown in idealized form and neglecting possible transient processes. These transient processes take effect particularly shortly after the switch 12 is turned on, that is to say shortly after the first pulse-width-modulated signal S41 assumes a turn-on level. As the on-time increases, however, the real time profiles approximate to the idealized time profiles shown in FIG. 13, which means that particularly the statements made above relating to the rise in the voltage V76 after the switch 73 has opened are correct.

Figure 15:
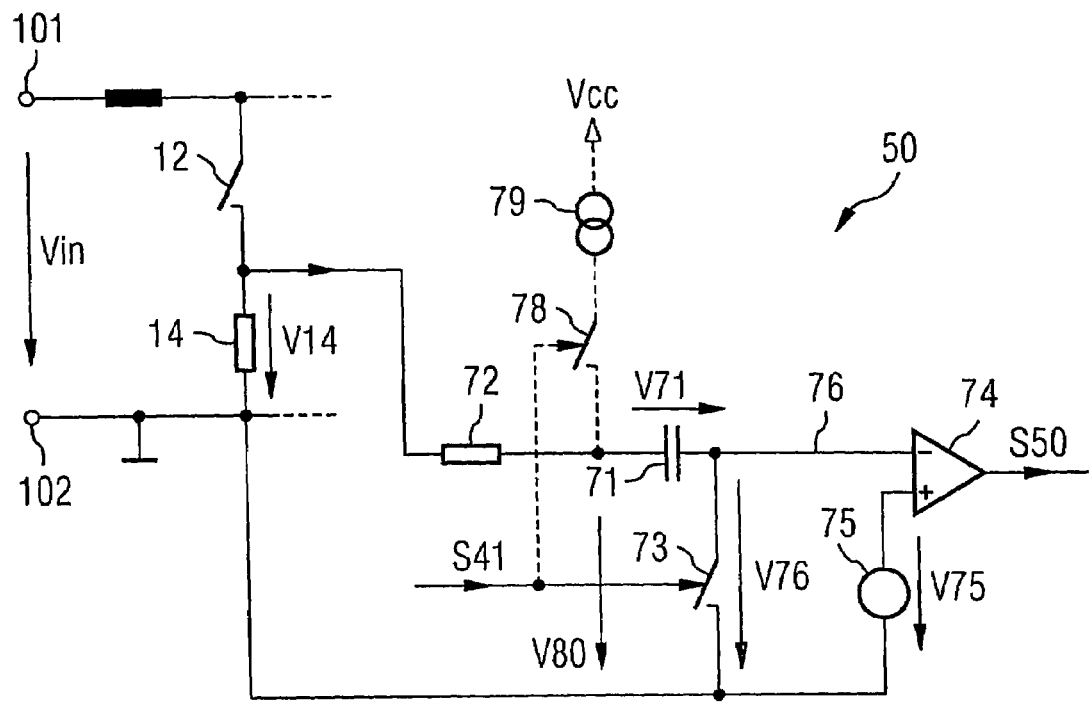
FIG. 15 shows a modified second signal generation circuit as compared to the circuit shown in FIG. 12.

FIG. 15 shows a variant for the delay circuit 50 shown in FIG. 12. In this case, the resistor 72 is not connected in series with the switch 73 between the inputs of the comparator 74, but rather is connected between the measuring resistor 14 and the capacitive storage element 71 in the signal line for the measurement signal S14. When the switch 73 is closed, the series circuit containing the resistor 72 and the capacitive storage element 71 is in parallel with the measuring resistor 14, so that the capacitive storage element 71 is charged in line with the ramped profile of the voltage V14 across the measuring resistor 14 and with the delay by the time constant of the RC element formed by the resistor 72 and the capacitive storage element 71. If the switch 73 is opened after the end of T1, no further current flows via the resistor 72, and the input voltage V77 abruptly changes to a positive voltage value which corresponds to the voltage drop across the resistor 72 before the switch 73 was opened. This positive voltage value is all the greater the more steeply the measurement voltage V14 has risen during the first ontime T1. From this positive voltage value, the voltage V76 applied to one input of the comparator continues to rise in ramped fashion and reaches the comparison voltage V75 all the earlier the steeper the measurement voltage V14 and hence the voltage V76 on the comparator input rise during the second on-time T2 and the higher the sudden voltage change in the comparator voltage V76 when the switch 73 is opened.

Optionally, the circuit shown in FIG. 15 is provided with a switchable current source which, in the example, is shown as a series circuit containing a current source 79 and a switch 78. This current source 78, 79 is actuated by the first pulse-width-modulated signal S41 and is used to feed a current into a node which is common to the resistor 72 and to the capacitive storage element 71 during the first on-time T1.

During the first on-time T1, the current from the current source 78, 79 flows via the resistor 72 and the measuring resistor 14. Whereas the voltage drop caused by this across the measuring resistor 14 is negligible, the flow of current produces a voltage drop across the resistor 72 which increases the voltage V71 to which the capacitor 71 is charged. At the end of the first on-time T1, the current source 78, 79 is turned off. As a result, the previously described sudden positive voltage change at V77 is overlaid with a sudden negative voltage change whose level corresponds to the voltage drop from the current source 79 across the resistor 72. In this case, the level of the overlaid sudden negative voltage change is not dependent on the speed at which the measurement voltage V14 rises during the first on-time T1, and hence is not dependent on the input voltage Vin.

Figure 14:
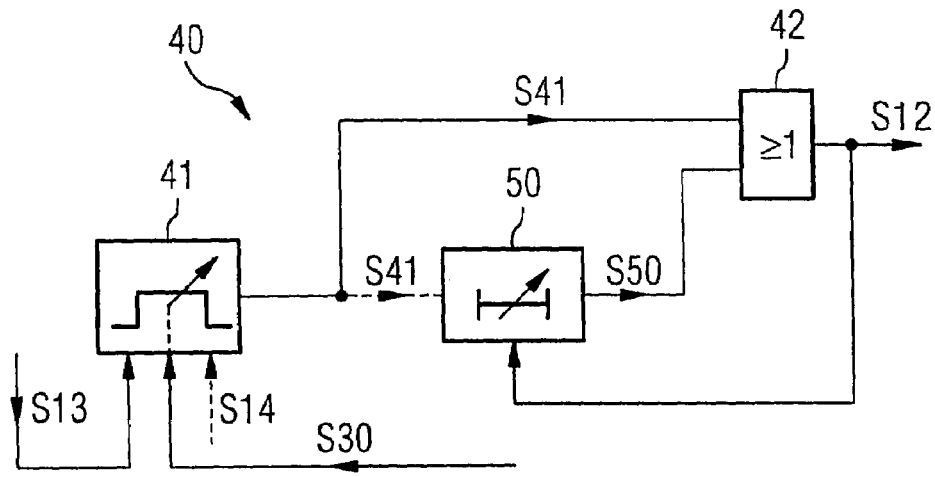
FIG. 14 shows a further example of an inventive actuating circuit.
Figure 16:
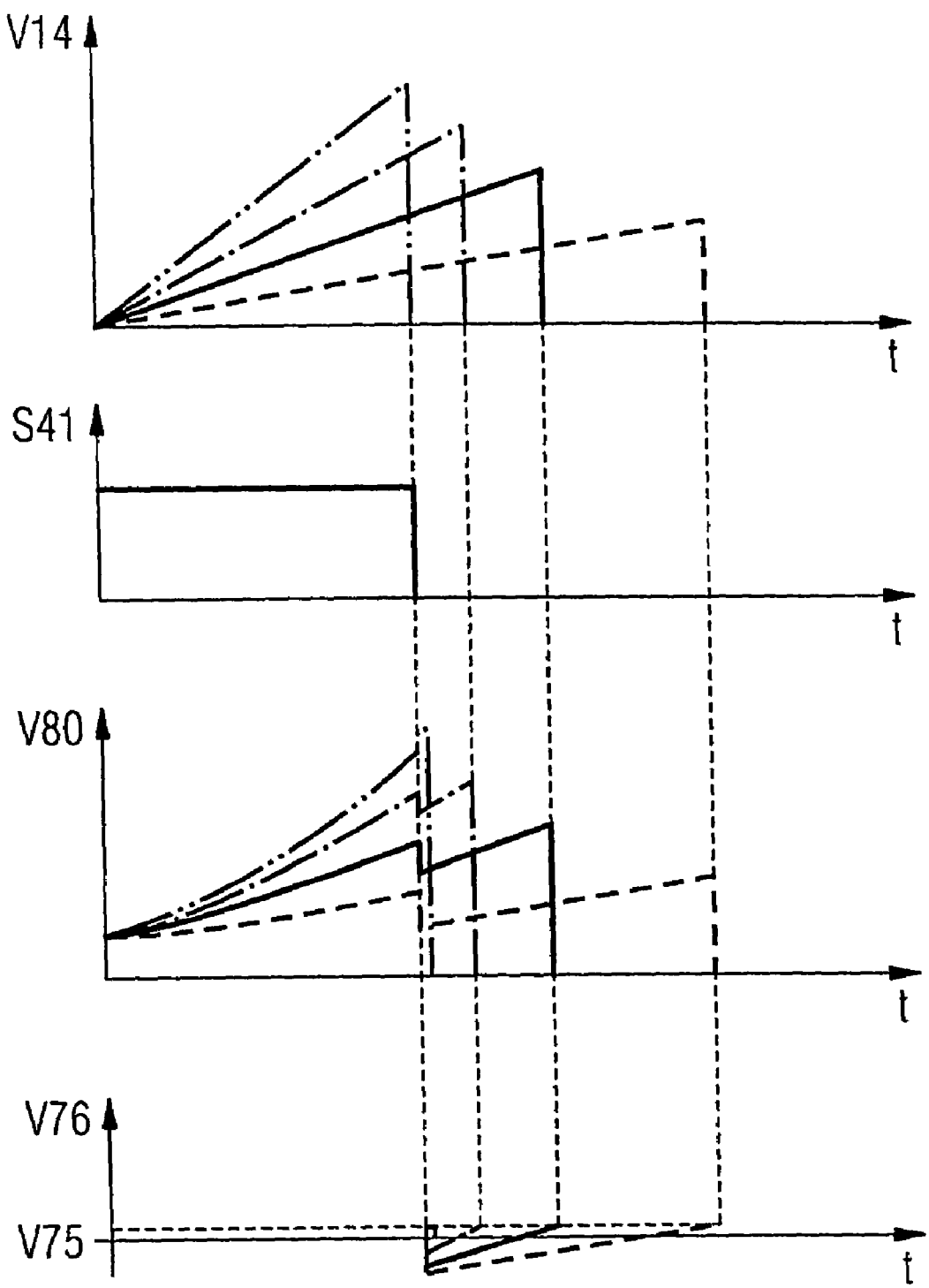
FIG. 16 illustrates the functionality of the second signal generation circuit shown in FIG. 15 works using signal time profiles.

Signal profiles for the circuit shown in FIG. 14 are shown in FIG. 16. In this case V80 denotes a voltage across the series circuit containing the capacitive storage element 71 and the switch 73 or an electrical potential on the node which is common to the capacitive storage element 71 and to the resistor 72 relative to reference-ground potential. Assuming that the current source 78, 79 has already been actuated before the start of the first on-time T1, this voltage V80 starts to rise in ramped fashion from an initial value when the first on-time T1 starts, said voltage being initially rounded and then delayed in accordance with the RC time constant of the RC element 71, 72. In this case, the initial value of the voltage V80 corresponds to the voltage drop across the resistor 72 as a result of the current from the current source 78, 79.

At the end of the first on-time T1, the voltage V80 suddenly changes to the value of the measurement voltage V14, because from this time onward the resistor 72 has zero current. The sudden voltage change is negative for the dashed, solid and dot-dash lines in FIG. 16, because in accordance with the ramp gradient of V14 the current for charging the capacitor 71 is smaller than the current from the source 79, and accordingly the voltage V80 before the switches 73 and 78 were opened was higher than V14. For the double-dot-dash line, the voltage drop across the resistor 72 has an inverse arithmetic sign during T1, and therefore a sudden positive voltage change to V80 is produced at the end of T1.

A sudden voltage change with the same level and polarity is also produced with the voltage V76 on the input of the comparator 74 with the difference that this voltage V76 starts at zero at the end of the first turned-on time T1. Following deactivation of the current source 78, 79 and opening of the switch 73, the voltage V80 and the voltage V76 across the comparator continue to rise in ramped fashion in parallel with the measurement voltage V14 and reach the threshold voltage V75 all the earlier the steeper these voltages V14, V80, V77 rise and the higher the sudden voltage change in a positive direction at the start of the second on-time T2. In the example in FIGS. 15 and 16, the threshold voltage V75 is chosen to be lower in comparison with the example in FIG. 12, specifically by the value of the voltage which drops across the resistor 72 during the first on-time T1 on account of the current from the current source 78, 79.

The actuating circuit may be in the form of an integrated circuit to which the measuring resistor 14 and the resistor 72 are connected as external components. The denominator function N (Vin) in the case of such a circuit can be scaled using the value of the resistor 72 without requiring a further IC connection.

In another example of the actuating circuit, which is shown in FIG. 14, provision is made for the second signal generation circuit 50 to derive a piece of information about the input voltage Vin from the duty ratio (duty cycle) of the actuator signal S12 and to generate a second pulse-width-modulated signal S50 whose falling edge is offset by the second period of time T2 with respect to the falling edge of the first pulse-width-modulated signal S41. In the case of the uninterrupted delta current mode explained with reference to FIG. 4, the following applies for the input voltage Vin on the basis of the output voltage Vout, the on-time Ton and the off-time Toff:

$$Vin = \frac{Vout}{1 + \frac{Toff}{Ton}}. \tag{18}$$

On the basis of an output voltage regulated to a constant value, the input voltage Vin can therefore be derived directly from the ratio of the off-time Toff to the on-time Ton. In this case, the second pulse-width-modulated signal S50 is generated using digital means, for example, which relate the second on-time T2 to the input voltage Vin in the manner explained and which generate the second pulse-width-modulated signal S50 accordingly.

Figure 17:
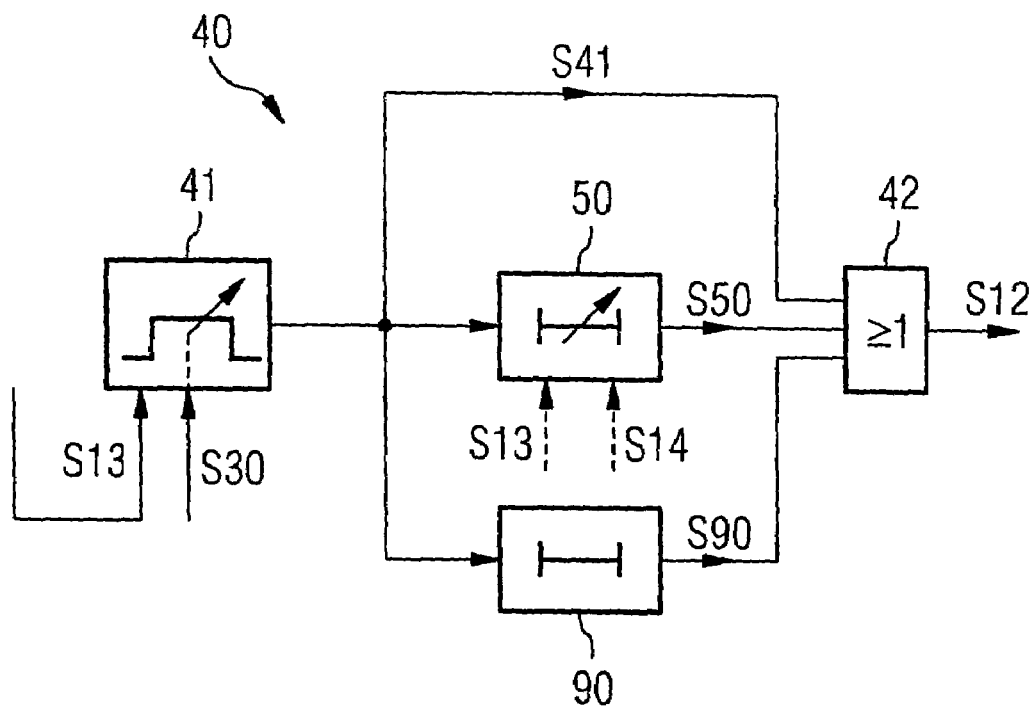
FIG. 17 shows a further example of an actuating circuit of the invention.

FIG. 17 shows a further example of an actuating circuit 40 for generating the actuating signal S12 for the switch (12 in FIG. 1). Besides the first and second signal generation circuits or the first and second delay elements 41, 50, this actuating circuit 40 has a third delay circuit or a third delay element 90. Output signals S41, S50, S90 from these three delay elements are supplied to an OR gate 42, the output of which provides the actuating signal S12. In the case of this actuating circuit 40, the second and third delay elements 50, 90 are actuated by the first delay element. In this arrangement, a second and a third on-time T2', T3 for the second and third delay elements 50, 90 start to run at the end of a first on-time T1' generated by the first delay element. An on-time Ton for the actuating signal S12 in this arrangement corresponds to the sum of the first delay time T1' and the longer of the second and third delay times T2', T3. That is to say:

$$Ton=T1'+\max(T2',T3) \tag{19}$$

where max(T2',T3) denotes the maximum for the second and third on-times.

In this arrangement, the first delay element 41 produces the first on-time T1' on the basis of the control signal S30 and reduces it by a constant offset b/c, so that the following applies:

$$T1' = f(S30) - \frac{b}{c}. \tag{20}$$

The third delay element 90 produces a constant on-time T3 whose value corresponds to the offset for the first on-time, and the second delay element 50 produces a second on-time, which is inversely proportional to a first-degree function for the instantaneous value of the input voltage. Hence:

$$T2' = \frac{a}{c \cdot Vin + d} \tag{21}$$

$$T3 = \frac{b}{c} \tag{22}$$

Figure 18:
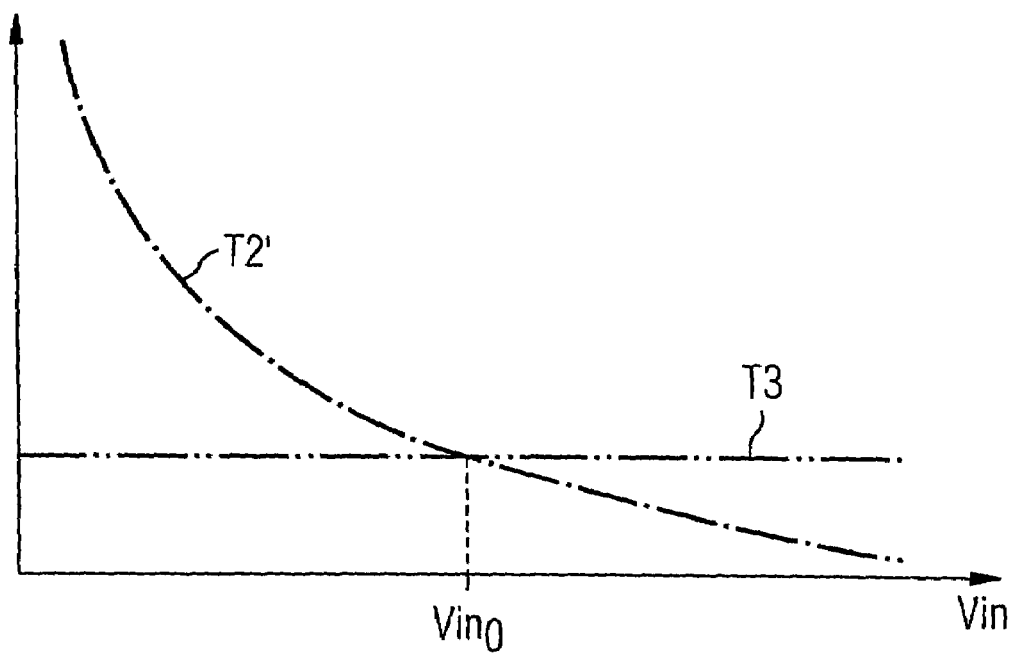
FIG. 18 illustrates the functionality of the actuating circuit of FIG. 17 using signal profiles.

These two delay times T2', T3 are plotted in FIG. 18 as a function of the input voltage Vin.

In this arrangement, the second and third delay elements are in tune with one another such that for instantaneous values of the input voltage Vin which are smaller than $Vin_0$ the second on-time T2' is longer than the third on-time T3, whereas for instantaneous values of the input voltage Vin which are greater than $Vin_0$ the third on-time T3 is longer, with T2'=T3 applying for Vin=$Vin_0$. In this context, the entire on-time Ton can be represented as follows:

$$Ton = T1' + T2' = f(S30) - \frac{b}{c} + \frac{a}{c \cdot Vin + d} \text{ for } Vin \leq Vin_0 \tag{23a}$$

$$Ton = T1' + T3 = f(S30) - \frac{b}{c} + \frac{b}{c} \text{ for } Vin > Vin_0 \tag{23b}$$

In this arrangement, the arrangement containing the first and second delay elements 50, 90 brings about a delay or an ontime for Vin≦$Vin_0$ which is inversely proportional to a first-degree function for the input voltage and which is subject to a constant offset b/c. For Vin>$Vin_0$, the delay corresponds to the offset b/c. To compensate for this offset, the on-time produced by the first delay element 41 is shortened by this offset.

Overall, an on-time Ton which is a function of the control signal S30 and which, in particular, may be proportional to the control signal S30 is obtained for Vin>$Vin_0$. For Vin≦$Vin_0$, the on-time Ton has a first on-time period, which is a function of the control signal S30 and which, in particular, may be proportional to the control signal S30, and a second on-time period, which is proportional to a quotient for two first-degree functions for the input voltage. The latter follows for d=0, taking account of equation (9) directly from equation (23a).

Figure 19:
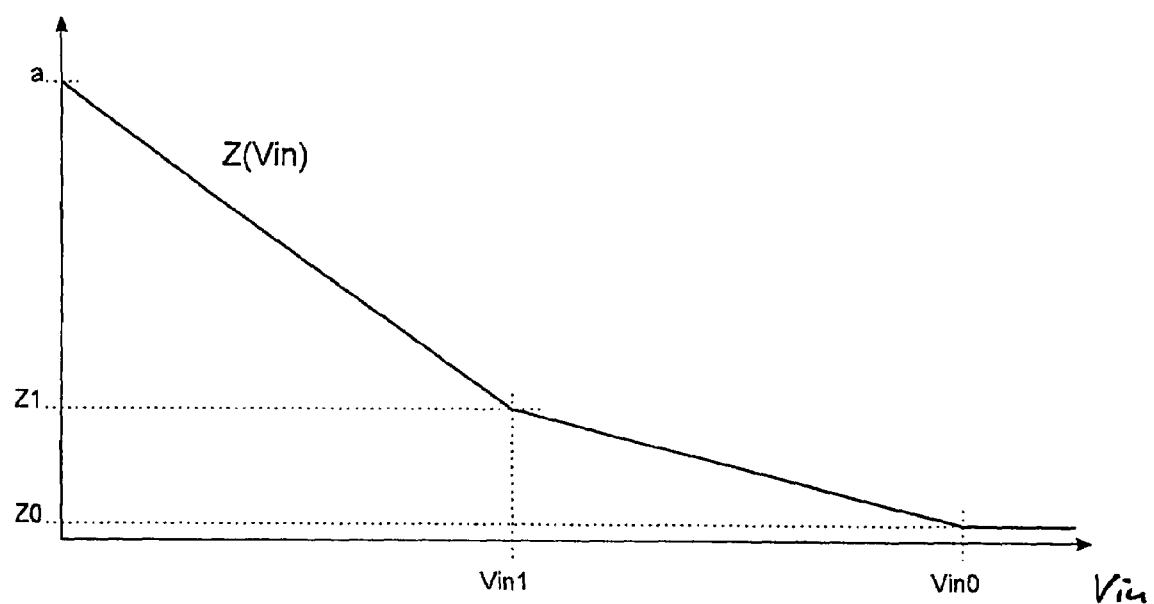
FIG. 19 for a further example, in which the denominator function comprises two linear sections having different slopes, illustrates a profile of the denominator function dependent on the input voltage.
Figure 26:
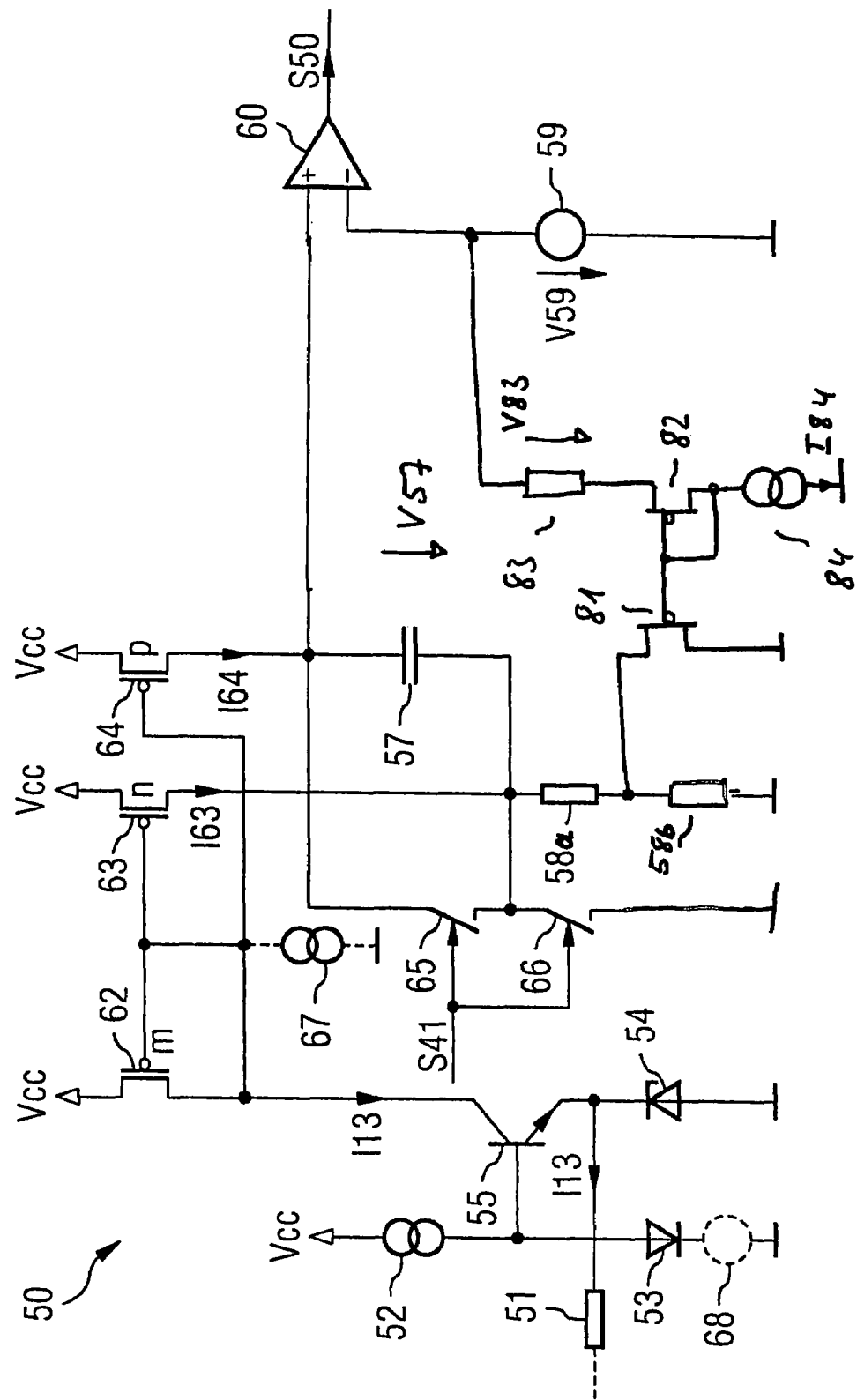

FIG. 19 illustrates the profile of the denominator function Z(Vin) for a further example. The denominator function Z (Vin) in this example comprises two linear sections, for which the denominator function Z (Vin) decreases with increasing input voltage Vin. For input voltage values between zero and a first threshold value $Vin_1$ the denominator function has a first slope b, and for input voltage values between the first threshold value $Vin_1$ and a second threshold value $Vin_0$ the denominator function Z (Vin) has a second slope b'. For input voltage values higher than the second threshold value $Vin_0$ the denominator function is constant, which is in accordance with the example in FIG. 5B. For the denominator function Z (Vin) illustrated in FIG. 19 dependent on the input voltage Vin we have:

$$Z(Vin)=a-b \cdot Vin \text{ for } 0 \leq Vin \leq Vin_1 \tag{24a}$$

$$Z(Vin)=Z_1-b' \cdot Vin \text{ for } Vin_1 < Vin \leq Vin_0 \tag{24b}$$

$$Z(Vin)=Z_0 \text{ for } Vin > Vin_0 \tag{24c}$$

Having functions according to equations (24a) and (24b) the denominator function comprises two first-degree partial functions, where a first partial function (24a) applies for a first range of values—zero to the first threshold value $Vin_1$ in the example, and where a second partial function (24b) applies for a second range of values—the first threshold value $Vin_1$ to the second threshold value $Vin_0$ in the example. The second partial function comprises a smaller first-degree coefficient as compared to the first partial function.

For the first threshold value $Vin_1$ of the input voltage Vin the denominator function takes a first intermediate value Z1. For input voltage values higher than the second threshold value $Vin_0$ the denominator function referring to equation (24c) is constant. The denominator function is continuous, for the first intermediate value $Z_1$ and the value $Z_0$ therefore applies:

$$Z_1 = a - b \cdot Vin_1 \quad (25a)$$

$$Z_0 = Z_1 - b' \cdot Vin_0 = a - b \cdot Vin_1 - e \cdot Vin_0 \quad (25b).$$

The first slope b may be two times to four times the second slope b', i. e. b=2 . . . 4·b'. The second threshold value $Vin_0$ is, for example, selected such that it corresponds to the peak value of a maximum input or means voltage or a maximum expected input or means voltage (Vin and Vn in FIG. 1), for which a low distortion factor is desired. The second threshold value $Vin_0$ may correspond to the output voltage (Vout in FIG. 1) of the power factor correction circuit or may lie between the peak value of the maximum means voltage, for which a low distortion factor is desired, and the output voltage. The first intermediate value $Vin_1$, for example, is in the range between 0.3 to 0.7 of the output voltage, i. e. 0.3·Vout<Vin1<0.7·Vout, and, in particular, may be half the output voltage Vout, i. e. $Vin_1 \approx 0. \cdot Vout$.

The numerator function associated with the denominator function Z (Vin) of FIG. 19 corresponds to the numerator function N (Vin) explained above and, therefore, is not illustrated in the figure.

Using a denominator function according to FIG. 19 for determining the second on-time period results in a further decrease of the distortion factor, as compared to the denominator function of FIG. 5B, because for small instantaneous values of the input voltage, i. e. for input voltage values smaller than the first threshold value $Vin_1$, the on-time period is increased significantly more than for larger input voltage values of the interval [$Vin_1$, $Vin_0$] between the first and second threshold value.

An example of a second signal generation circuit, that effects a second on-time period having a denominator function according to FIG. 19, is shown in FIG. 20. This signal generation circuit is based on the second signal generation circuit of FIG. 10, where only differences as compared to the circuit of FIG. 10 will be explained in the following.

In the circuit of FIG. 10 the resistance of a resistor connected in series to capacitor 57 defines a constant fraction of voltage V57+V58 that is compared with reference voltage V59, and the capacitance of capacitor 57 defines a fraction V57 increasing over time. The DC fraction V58 and the slope of the varying fraction V57 are proportional to current I13 and therefore proportional to the instantaneous value of input voltage Vin. Given the capacitance value of capacitor 57 an increase in the on-time period with increasing input voltage Vin is the stronger the higher the resistance of resistor 58 is. The steepness of the profile of denominator function Z(Vin) therefore increases with increasing resistance.

In the signal generation circuit 50 of FIG. 20 instead of resistor 58 first and second partial resistors 58*a*, 58*b* are used. These partial resistors 58*a*, 58*b* are connected in series to capacitor 57 and in parallel to optional switch 66. A voltage limiting circuit 81-84 is connected to a circuit node common to both partial resistors 58*a*, 58*b* and serves for limiting an electrical potential at this circuit node, or a voltage across partial resistor 58*b*, respectively, to a given value. The voltage limiting circuit according to the example comprises two transistors 81, 82. For the following explanation it is assumed that these transistors are p-channel MOS-FET. It should be noted, that instead of MOSFET bipolar transistors may be used as well.

Each of MOSFET 81, 82 comprises a gate terminal serving as a control terminal and drain-source-paths serving as load paths. The two gate terminals of MOSFET 81, 82 are conductively connected to each other. The drain-source-path of a first 81 of these MOSFET 81, 82 is connected in parallel to the second partial resistor 58*b*. The second 82 of these MOS-FET 81, 82 is connected as a diode in that its gate terminal and its drain terminal are short circuited. The load path of second MOSFET 82 is connected in series to a resistor 83 and a current source 84 between terminals for a supply potential and a reference potential. In the example the supply potential is the reference potential V59 provided by reference voltage source 59. A gate potential of first MOSFET 81 is defined by the gate and source potential of the second MOSFET 82. This source potential approximately corresponds to the reference potential V59 minus a voltage drop V83 across resistor 83. This voltage drop is dependent on the resistance of resistor 83 and a current I84 provided by current source 84.

First MOSFET 81 blocks if the electrical potential at its source terminal, i. e. the electrical potential at the node common to the partial resistors 58*a*, 58*b*, is smaller than the gate potential plus a threshold voltage of first MOSFET 81, with the gate potential being provided by a series circuit comprising resistor 83, the second transistor 82 and the current source 84. If the electrical potential at the node common to partial resistors 58*a*, 58*b* exceeds the gate potential for the threshold voltage of first MOSFET 81, or more, first MOSFET 81 turns on and limits the electrical potential at this circuit node to a voltage limiting value. The voltage limiting value is approximately the reference voltage V59 minus the voltage drop V83 at resistor 83.

Due to the voltage limiting circuit 81-84 the signal generation circuit 50 according to FIG. 2 comprises two operating states: a first operating state, in which the voltage limiting circuit is not activated; and a second operating state, in which the voltage limiting circuit is activated. In the first operating state, the current I13, which is dependent on the input voltage Vin, and current I63 are small enough for the voltage drop V58*b* across the second partial resistor 583 to be smaller than the voltage limiting value. The signal generation circuit in this operating states works like the signal generation circuit of FIG. 10. In the signal generation circuit of FIG. 10 with increasing input voltage Vin the second on-time period decreases dependent on the input voltage Vin and the resistance of resistor 85 while in the circuit according to FIG. 20 the on-time period decreases dependent on the input voltage Vin and dependent on a sum of resistances of the two partial resistors 58*a*, 58*b*. During this first operating state the slope of denominator function Z(Vin) is dependent on the sum of resistances of the two partial resistors 58*a*, 58*b*. For higher input voltages Vin, for which voltage drop V58*b* across partial resistor 58*b* is higher than the voltage limiting circuit, the voltage limiting circuit 81-8 is activated. The voltage drop across the two partial resistors 58*a*, 58*b* therefore only increases proportional to the resistance of first partial resistor 58*a*. Thus, for higher input voltages Vin the second on-time period is shortened less with increasing input voltage Vin, which corresponds to a reduction of the slope of denominator function. The first threshold value $Vin_1$ shown in FIG. 19, for which the slope of denominator function flattens may be adjusted using voltage limiting circuit 81-84. $Vin_1$ in this connection corresponds to the particular value of the input voltage Vin, for which the voltage drop across the second partial resistor 58b corresponds to the voltage limiting value. The slope of denominator function may be adjusted via the resistances of the two partial resistors 58a, 58b. The larger slope for first interval [0, $Vin_1$] results from the sum of resistances of the two partial resistors 58a, 58b. The smaller slope for second interval [$Vin_1$, $Vin_0$] results from the resistance of second partial resistor 58b.

The invention claimed is:

1. A method for actuating a switch regulating the power consumption in a power factor correction circuit which has input terminals for applying an input voltage and output terminals for providing an output voltage,
   in which the switch is cyclically turned on for an on-time and turned off for an off-time, respectively,
   in which a control signal which is dependent on the output voltage is generated, and
   in which the on-time has a first on-time period and a second on-time period which immediately precedes or succeeds the first on-time period, where
   a length of the first on-time period is dependent on the control signal, and
   a length of the second on-time period is proportional, at least for a given range of values for an instantaneous value of the input voltage, to a quotient having a first first-degree function for this instantaneous value in the denominator and a second first-degree function for the instantaneous value in the numerator, where function values for the first function increase as the instantaneous value rises.

2. The method as claimed in claim 1, in which the first function comprises a first first-degree partial function for a first range of values, and a second first-degree partial function for a second range of values, with the second range adjoining the first range in a direction of increasing instantaneous values of the input voltage.

3. The method as claimed in claim 2, in which the first partial function has a larger first-degree coefficient as compared to the second partial function in terms of its absolute value.

4. The method as claimed in claim 3, in which the first-degree coefficient of the first partial function is between two times to four times the first-degree coefficient of the second partial function.

5. The method as claimed in claim 2, in which the first function is continuous within the first and second ranges of values.

6. The method as claimed in claim 1, in which function values for the second function decrease as the instantaneous value rises.

7. The method as claimed in claim 1, in which the length of the second on-time period is inversely proportional to the input voltage at least for a given range of values for instantaneous values of the input voltage which are greater than zero.

8. The method as claimed in claim 1, in which the instantaneous value of the input voltage is determined indirectly from a gradient for a current flowing through the inductive storage element when the switch is closed.

9. The method as claimed in claim 1, in which the instantaneous value of the input voltage is determined indirectly from a voltage across an auxiliary coil when the switch is closed, the auxiliary coil being coupled inductively to an inductive charge store element in the power factor correction circuit.

10. The method as claimed in claim 1,
    in which the power factor correction circuit has an inductive storage element,
    in which a magnetization state of the inductive storage element is detected, and
    in which a on-time respectively starts when the inductive storage element assumes a prescribed magnetization state.

11. The method as claimed in claim 10, in which the prescribed magnetization state is reached when the inductive storage element is fully demagnetized.

12. The method as claimed in claim 10, in which the indirect ascertainment of the input voltage and the detection of the magnetization state are effected using a common signal.

13. An actuating circuit for a switch regulating the power consumption in a power factor correction circuit which has input terminals for applying an input voltage and output terminals for providing an output voltage, where the actuating circuit has:
    a control signal input for supplying a control signal,
    an input voltage signal input for supplying a signal which is dependent on the input voltage,
    an output for providing an actuating signal for the switch,
    means for cyclically generating an on-level for a signal actuating the switch for a on-time which has a first on-time period and a second on-time period which directly precedes or succeeds the first on-time period, where a length for the first on-time period is dependent on the control signal, and where a length for the second on time period is proportional to a quotient with a first first-degree function for this instantaneous value in the denominator and a second first-degree function for this instantaneous value in the numerator at least for a prescribed range of values for an instantaneous value of the input voltage, with function values of the first function increasing as the instantaneous value rises.

14. The actuating circuit as claimed in claim 13, in which the first function comprises a first first-degree partial function for a first range of values and a second first-degree partial function for a second range of values, with the second range adjoining the first range in a direction of increasing instantaneous values of the input voltage.

15. The actuating circuit as claimed in claim 14, in which the first partial function has a larger first-degree coefficient as compared to the second partial function in terms of its absolute value.

16. The actuating circuit as claimed in claim 15, in which the first-degree coefficient of the first partial function is between two times to four times the first-degree coefficient of the second partial function.

17. The actuating circuit as claimed in claim 14, in which the first function is continuous within the first and second ranges of values.

18. The actuating circuit as claimed in claim 13, which has:
    a first signal generation circuit which is adapted to generate a first pulse-width-modulated signal which is at a turn-on level for a first on-time which is dependent on the control signal,
    a second signal generation circuit which is adapted to generate a second pulse-width-modulated signal which is at a turn-on level, for a second on-time directly after an end or directly before a start of the turn-on level of the first pulse-width-modulated signal, which is proportional to a quotient with a first-degree function for a signal value of the input voltage signal or a change in the input voltage signal over time in the denominator and with a second first-degree function for a signal value of the input voltage signal or a change in the input voltage signal over time in the numerator.

19. The actuating circuit as claimed in claim 18, in which the input voltage signal is proportional to an instantaneous value of the input voltage and in which the second signal generation circuit has:
- a voltage-controlled current source which is supplied with the input voltage signal and which produces a current which is dependent on the input voltage signal,
- a capacitive storage arrangement,
- a switch arrangement which is supplied with the first pulse-width-modulated signal and which is designed to charge the capacitive storage element as stipulated by this first signal using the current provided by the current source arrangement,
- a comparator arrangement which compares a voltage across the capacitive storage arrangement with a reference voltage and generates the second pulse-width-modulated signal on the basis of this comparison.

20. The actuating circuit as claimed in claim 19, in which the capacitive storage arrangement has a capacitive storage element and a non-reactive resistor element connected in series with the capacitive storage element.

21. The actuating circuit as claimed in claim 20, in which the capacitive storage element has a first current flowing through it which is dependent on the input voltage signal, and
the non-reactive resistor element has a further current flowing through it which is dependent on the input voltage signal.

22. The actuating circuit as claimed in claim 21,
in which the current source arrangement produces a first current which is dependent on the input voltage signal and a second current which is dependent on the input voltage signal,
in which the first current flows through the series circuit containing the capacitive storage element and the resistor element, and the second current is fed to a node which is common to the capacitive storage element and to the resistor element and flows only through the resistor element.

23. The actuating circuit according to claim 20,
in which the ohmic resistor component comprises a first and a second partial resistor, that are connected in series, and
in which a voltage limiting circuit is connected in parallel to the second partial resistor.

24. The actuating circuit as claimed in claim 19, in which the reference voltage is dependent on the input voltage signal and decreases for input voltage signal values which result from rising instantaneous values of the input voltage.

25. The actuating circuit as claimed in claim 19,
in which the input voltage signal is a voltage across an auxiliary coil, where the auxiliary coil has a first connection connected to a reference-ground potential and has a second connection connected to the second signal generation circuit, and
in which the current source arrangement in the second signal generation circuit has a non-reactive resistor element, which is connected to the second connection of the auxiliary coil, and a control circuit which is connected to a connection of the resistor element which is remote from the auxiliary winding and which is designed to set an electrical potential on this connection at least approximately to reference-ground potential.

26. The actuating circuit as claimed in claim 19, in which the input voltage signal is a signal which changes over time on the basis of an instantaneous value of the input voltage and in which the second signal generation circuit has:
a comparator arrangement with a first and a second input whose first input is supplied with the input voltage signal and whose second input is supplied with the reference signal, and which generates the second pulse-width-modulated signal on the basis of a comparison between the input voltage signal and the reference signal.

27. The actuating circuit as claimed in claim 26, in which the first input of the comparator arrangement has a coupling capacitance connected upstream of it.

28. The actuating circuit as claimed in claim 21, in which a switch controlled by the first pulse-width-modulated signal is connected between the first input of the comparator arrangement and a terminal for a reference-ground potential.

29. The actuating circuit as claimed in claim 28, in which a non-reactive resistor element is connected in series with the switch.

30. The actuating circuit as claimed in claim 28, in which a non-reactive resistor element is connected in series with the coupling capacitance.

31. The actuating circuit as claimed in claim 30, in which a switchable current source is connected to a connection of the resistor element.

* * * * *